(12) United States Patent
Hamada et al.

(10) Patent No.: US 8,976,650 B2
(45) Date of Patent: Mar. 10, 2015

(54) METHOD AND APPARATUS FOR RETAINING A REMAINING BACK-OFF TIME IN CSMA/CA BASED ON A THRESHOLD

(75) Inventors: Yuji Hamada, Tokyo (JP); Yukio Goto, Tokyo (JP); Masahiko Ikawa, Tokyo (JP); Shigeki Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 367 days.

(21) Appl. No.: 13/520,353

(22) PCT Filed: Feb. 24, 2011

(86) PCT No.: PCT/JP2011/054152
§ 371 (c)(1),
(2), (4) Date: Jul. 3, 2012

(87) PCT Pub. No.: WO2011/108439
PCT Pub. Date: Sep. 9, 2011

(65) Prior Publication Data
US 2012/0275334 A1 Nov. 1, 2012

(30) Foreign Application Priority Data

Mar. 3, 2010 (JP) ................................. 2010-046142

(51) Int. Cl.
*H04W 74/08* (2009.01)
*H04W 56/00* (2009.01)

(52) U.S. Cl.
CPC ........ *H04W 74/085* (2013.01); *H04W 56/0045* (2013.01)
USPC ........................................... 370/230

(58) Field of Classification Search
CPC ....................... H04W 74/0808; H04W 74/0816
See application file for complete search history.

(56) References Cited

U.S. PATENT DOCUMENTS

| 7,660,325 | B2 | 2/2010 | Matsunaga |
| 8,085,706 | B2 | 12/2011 | Matsumoto |
| 8,107,490 | B2 * | 1/2012 | Horisaki et al. ............. 370/447 |
| 8,160,090 | B2 | 4/2012 | Yoshizawa et al. |

(Continued)

FOREIGN PATENT DOCUMENTS

| JP | 11-55266 A | 2/1999 |
| JP | 2000-83109 A | 3/2000 |
| JP | 2006-352653 A | 12/2006 |
| JP | 2007-28500 A | 2/2007 |
| JP | 2008-199289 A | 8/2008 |

(Continued)

OTHER PUBLICATIONS

International Preliminary Report on Patentability and Written Opinion issued Mar. 29, 2011 in PCT/JP2011/054152 with English Translation.

*Primary Examiner* — Benjamin Lamont
(74) *Attorney, Agent, or Firm* — Oblon, McClelland, Maier & Neustadt, L.L.P.

(57) ABSTRACT

A communication control apparatus in which, when requested to transmit (transmission) terminal information from information processing means, a transmission timing controller obtains past own terminal communication band information from an information storage, and determines whether or not to control a transmission timing. Moreover, the transmission timing controller calculates a back-off parameter for the control based on a past reception power information history that is obtained from the information storage, and sets a back-off parameter to a transmission device.

9 Claims, 24 Drawing Sheets

(56) References Cited

U.S. PATENT DOCUMENTS

| | | |
|---|---|---|
| 2008/0222478 A1 | 9/2008 | Tamaki |
| 2009/0207769 A1* | 8/2009 | Park et al. ............... 370/311 |
| 2014/0153514 A1* | 6/2014 | Nezou et al. ............ 370/329 |
| 2014/0219256 A1* | 8/2014 | Viger et al. ............. 370/336 |

FOREIGN PATENT DOCUMENTS

| | | |
|---|---|---|
| JP | 2008-219084 A | 9/2008 |
| JP | 2008-227642 A | 9/2008 |
| JP | 2008-311733 A | 12/2008 |
| WO | WO 2008/010387 A1 | 1/2008 |

* cited by examiner

F I G. 6

| COMMUNICATION BAND UTILIZATION RATE[%] | TRANSMISSION OFFSET [msec] |
|---|---|
| 0-5 | 20 |
| 5-10 | 10 |
| 10-15 | 7.5 |
| 15-20 | 5 |
| 20-25 | 4 |
| 25-50 | 2 |
| 50-100 | 1 |

| RECEPTION POWER [dBm] | CWmin | CWmax | THE NUMBER OF RE-TRANSMISSIONS R |
|---|---|---|---|
| ~-85 | 256 | 4096 | 10 |
| -85~-80 | 256 | 2048 | 9 |
| -80~-75 | 128 | 1024 | 8 |
| -75~-70 | 128 | 1024 | 7 |
| -70~-65 | 64 | 1024 | 6 |
| -65~-60 | 64 | 1024 | 5 |
| -60~-55 | 32 | 1024 | 4 |
| -55~-50 | 32 | 1024 | 3 |
| -50~-45 | 16 | 1024 | 2 |
| -45~ | 16 | 1024 | 1 |

F I G. 1 0
| RELATIVE DISTANCE [m] | CW |
|---|---|
| 0-10 | 8 |
| 10-20 | 16 |
| 20-30 | 32 |
| 30-40 | 64 |
| 40-50 | 128 |
| 50-60 | 256 |
| 60-70 | 512 |
| 70-80 | 1024 |
| 80-90 | 2048 |
| 90- | 4096 |
F I G. 1 1
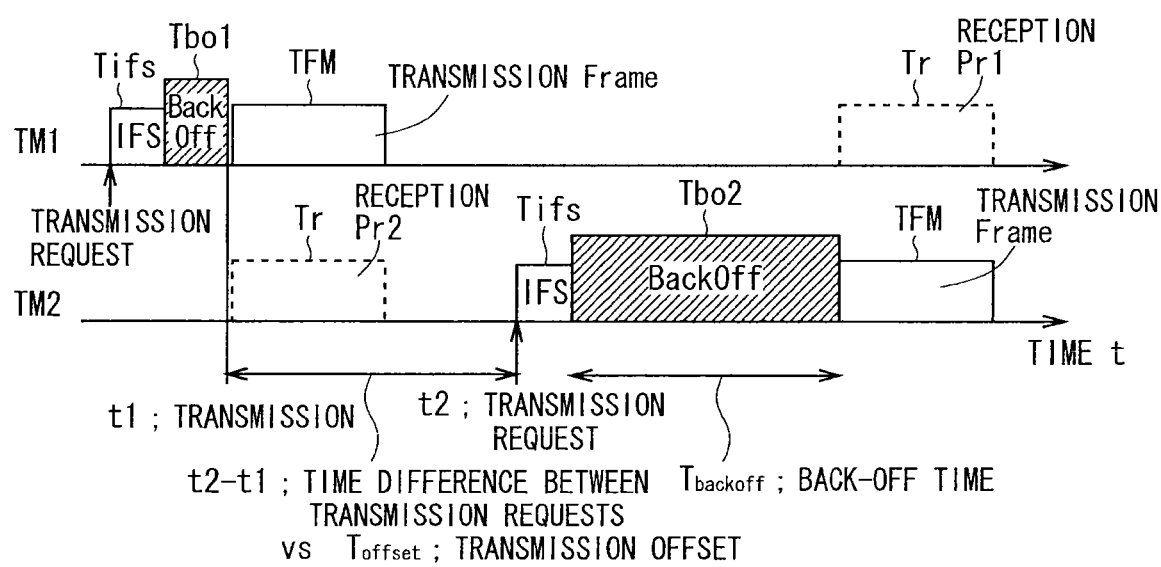

| TARGET COMMUNICATION BAND UTILIZATION RATE[%] | THE NUMBER OF CONSECUTIVE TRANSMISSIONS |
|---|---|
| 0-5 | 5 |
| 5-10 | 4 |
| 10-20 | 3 |
| 20-40 | 2 |
| 40-100 | 1 |

FIG. 22

| RECEPTION POWER [dBm] | SHIFT PARAMETER α |
|---|---|
| ~-85 | 10 |
| -85~-80 | 9 or 11 |
| -80~-75 | 8 or 12 |
| -75~-70 | 7 or 13 |
| -70~-65 | 6 or 14 |
| -65~-60 | 5 or 15 |
| -60~-55 | 4 or 16 |
| -55~-50 | 3 or 17 |
| -50~-45 | 2 or 18 |
| -45~ | 1 or 19 |

FIG. 24
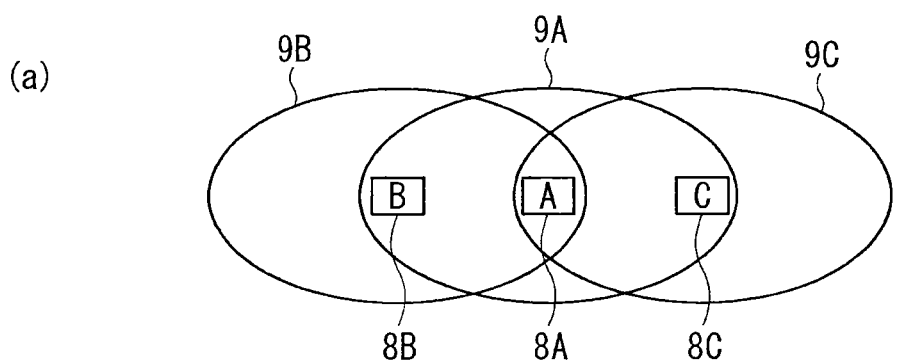
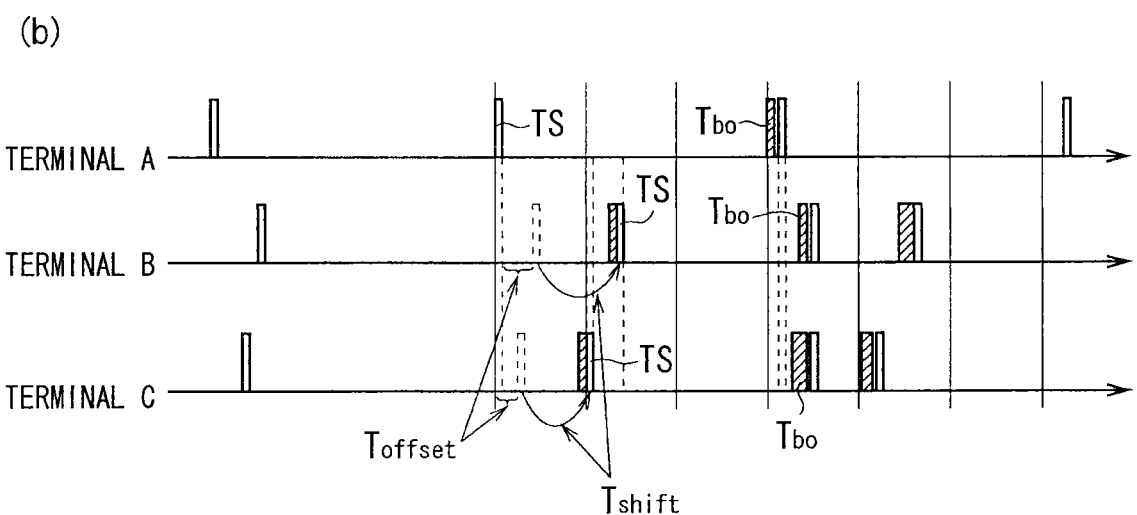

F I G. 2 5
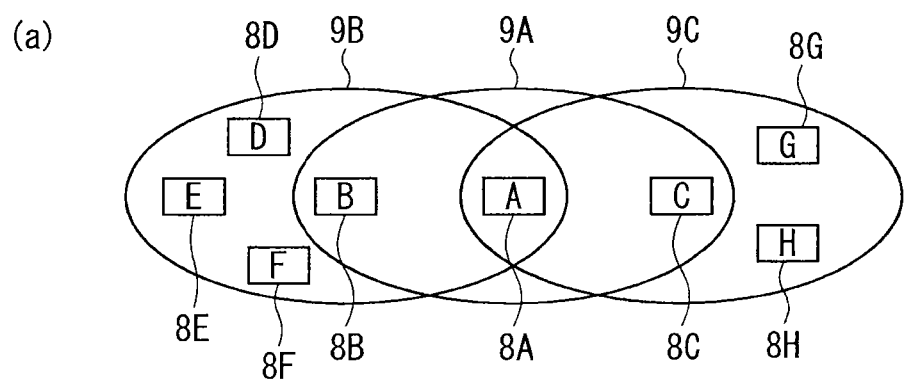
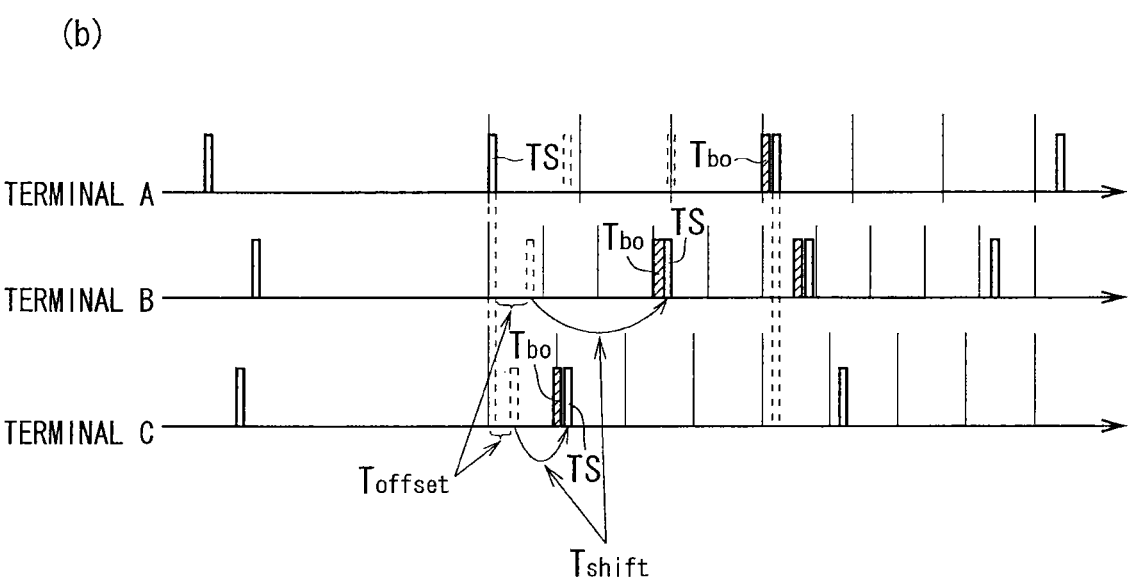

METHOD AND APPARATUS FOR RETAINING A REMAINING BACK-OFF TIME IN CSMA/CA BASED ON A THRESHOLD

TECHNICAL FIELD

The present invention is an invention relating to a communication control apparatus that is mounted on a terminal for achieving efficient wireless communication between terminals, and to a communication control method, and particularly relating to a communication control apparatus capable of improving communication quality by making such a control that distributes a transmission timing for transmitting information.

BACKGROUND ART

Conventionally, a communication apparatus for wireless communication between terminals has adopted the CSMA/CA (Carrier Sense Multiple Access with Collision Avoidance) scheme as an access scheme, in order that the terminal can achieve wireless communication in an autonomous distributed manner.

The CSMA/CA scheme is generally known as a method that avoids wireless communication collision, in which when a terminal wirelessly transmits information, the terminal waits for a random back-off time before transmission and then performs carrier sensing performed for confirming whether or not a peripheral terminal is in communication, and while the peripheral terminal is in transmission, the own terminal further waits for a random back-off time before transmission and if the peripheral terminal is not in transmission, the own terminal starts transmission.

On the other hand, studies have been made for a method of putting a driving support system into practical use by utilizing a communication apparatus that performs road-to-vehicle communication for communication between a fixed terminal such as a roadside device and a mobile terminal or vehicle-to-vehicle communication for communication between mobile terminals. In this case, an application of the communication apparatus generally adopts such a communication method that terminal information such as the position of each terminal, the moving speed, and the vehicle type are transmitted between terminals in each certain period.

In the CSMA/CA scheme, in a case of periodically transmitting the terminal information, if the number of communication terminals within a communication range increases, the reliability of communication would be deteriorated to make it impossible to provide the driving support system, because: each terminal repeatedly waits for a back-off time before transmission so that congestion occurs that makes transmission impossible; transmission timings after the back-off time coincide with each other with a higher probability so that wireless communication packets collide with each other; collision occurs with a wireless communication packet of a hidden terminal, that is, a terminal that cannot be found by carrier sensing.

Moreover, even though congestion or packet collision occurs, the application that periodically transmits the terminal information cannot detect the occurrence of congestion or collision, and therefore in a next period, transmission is requested at the same timing and in the same period by the CSMA/CA. Thus, the possibility that information failing to be transmitted will be accumulated or the possibility that transmitted packets will collide with each other is still not reduced.

Therefore, Patent Document 1 discloses a wireless communication method in which, in the CSMA/CA scheme, a time when wireless transmission is performed is stored as a base time, and a time after elapse of a time interval corresponding to one period since the base time is set as a transmission timing in the next period, to thereby reduce the possibility that packet collision will occur in every period.

Patent Document 2 discloses a communication control apparatus in which, in the CSMA/CA scheme, a time after elapse of one period since a previous transmission timing is set as a base time, and a timing of periodically performing wireless communication is shifted back and forth by a predetermined time period in each period, to thereby reduce the possibility that packet collision will occur in every period.

PRIOR-ART DOCUMENTS

Patent Documents

Patent Document 1: Japanese Patent Application Laid-Open No. 2008-199289
Patent Document 2: Japanese Patent Application Laid-Open No. 2008-311733

SUMMARY OF THE INVENTION

Problems to be Solved by the Invention

In the wireless communication method disclosed in the Patent Document 1, after carrier sensing, a time point at which transmission can be performed is set as the base time. This involves a problem that if the same base time is set in terminals that cannot find each other by the carrier sensing, packet collision occurs in every period. Therefore, CSMA characteristics themselves cannot be improved.

In the communication control apparatus disclosed in the Patent Document 2, the timing is shifted back and forth from the base time by a predetermined random time period. This can reduce the possibility that collision will occur in every period, but involves a problem that the probability of packet collision cannot be reduced with respect to communication with a terminal that cannot be found by carrier sensing. Therefore, CSMA characteristics themselves cannot be improved.

The present invention has been made to solve the above-described problems, and an object of the present invention is to provide a communication control apparatus and a communication control method, capable of reducing collision of terminal information to be transmitted, in consideration of a terminal that cannot be found by carrier sensing, in order to avoid wireless communication collision.

MEANS FOR SOLVING THE PROBLEMS

A communication control apparatus according to the present invention is a communication control apparatus mounted in a predetermined terminal for performing wireless communication with at least one peripheral terminal other than the predetermined terminal. The communication control apparatus includes: reception means for receiving, as peripheral terminal information, terminal information transmitted from the at least one peripheral terminal, measuring reception power at a time when the peripheral terminal information is received, and measuring an own terminal communication band utilization rate that is the percentage of such a time that the predetermined terminal receives the peripheral terminal information with a radio wave intensity equal to or higher than a predetermined level; information storage means for storing, as stored information, the peripheral terminal information, the reception power, and the own terminal communication band utilization rate obtained from the reception means; information processing means for outputting transmission terminal information and giving a transmission request for requesting transmission by using the transmission terminal information; transmission timing control means for, in response to the transmission request, referring to the stored information and giving a data transmission process request by using transmission data that is based on the transmission terminal information; and transmission means for performing a data transmission process for transmitting the transmission data to the at least one peripheral terminal. In a case where a time difference between a last peripheral terminal reception time that is the latest reception time of the peripheral terminal information and a transmission request time that is a time when the information processing means has given the transmission request is less than a predetermined time, the transmission timing control means changes a transmission timing that is a timing when the transmission means is to perform the data transmission process, and in a case where the time difference is greater than the predetermined time, the transmission timing control means does not change the transmission timing.

EFFECTS OF THE INVENTION

In the communication control apparatus according to the present invention, the transmission timing control means determines whether or not to change the transmission timing based on the time difference between the last peripheral terminal reception time and the transmission request time.

Accordingly, whether or not to change the transmission timing can be controlled independently of carrier sensing performed for confirming whether or not the at least one peripheral terminal is in communication. This exerts an effect that the possibility of collision of transmission data with the at least one peripheral terminal can be reduced.

These and other objects, features, aspects and advantages of the present invention will become more apparent from the following detailed description of the present invention when taken in conjunction with the accompanying drawings.

BRIEF DESCRIPTION OF THE DRAWINGS

[FIG. 6] An explanatory diagram showing, in the form of a table, the relationship between a communication band utilization rate and a transmission offset.

[FIG. 10] An explanatory diagram showing, in the form of a table, the relationship between a relative distance to a peripheral terminal and a contention window CW.

[FIG. 11] An explanatory diagram schematically showing a specific example of a transmission timing control illustrated in FIG. 5.

[FIG. 22] An explanatory diagram showing, in the form of a table, the relationship between reception power and a shift parameter.

[FIG. 24] An explanatory diagram schematically showing a specific example of the transmission timing control according to the embodiment 3.

[FIG. 25] An explanatory diagram schematically showing a specific example of the transmission timing control according to the embodiment 3.

EMBODIMENT FOR CARRYING OUT THE INVENTION

<Embodiment 1>

An embodiment 1 according to the present invention will be described with reference to FIGS. 1 to 13. A communication control apparatus and a communication control method according to the embodiment 1 can provide services as a communication control apparatus of a road-to-vehicle communication system, can provide services as a communication control apparatus of a vehicle-to-vehicle communication system, and can provide services as other communication terminals. Here, in this embodiment 1, a description will be given on the assumption that the communication control apparatus serves as a main part of a terminal that is mounted on a vehicle.

Figure 1:
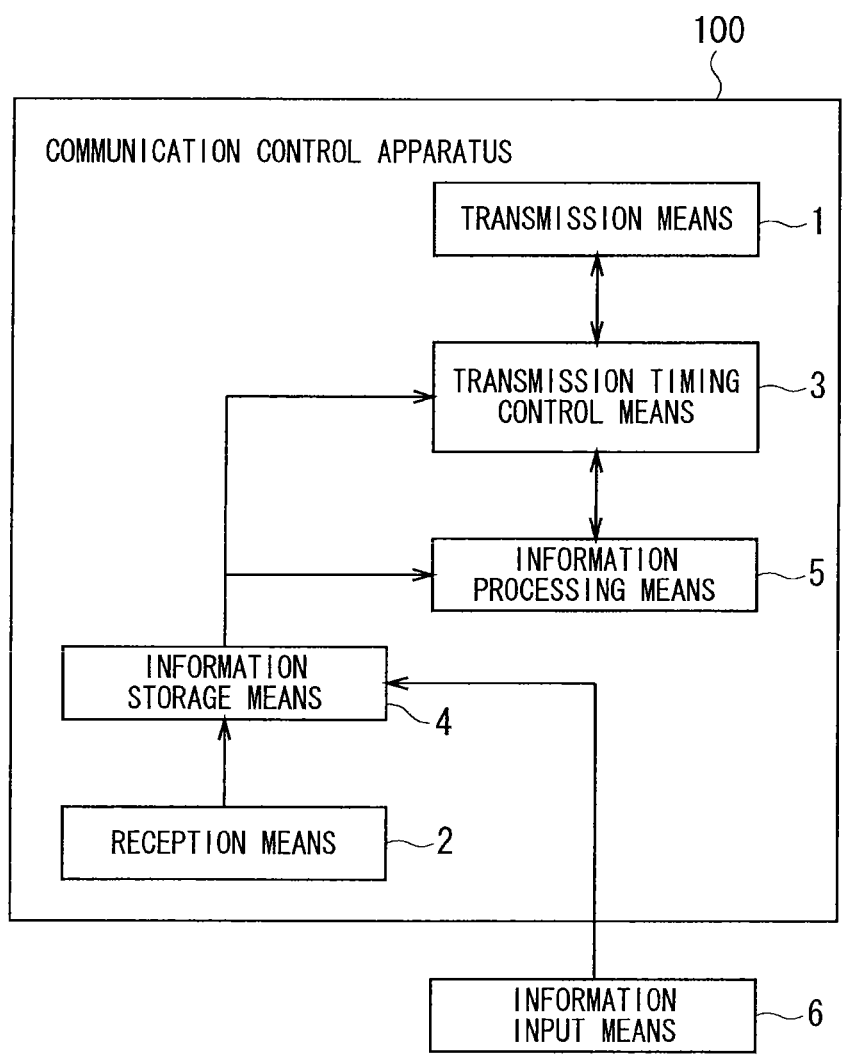
[FIG. 1] A block diagram showing an outline configuration of a communication control apparatus according to an embodiment 1 of the present invention.

FIG. 1 is a block diagram showing an outline configuration of a communication control apparatus 100 according to the embodiment 1 of the present invention. In this description, the same or equivalent parts of the configuration are denoted by the same reference numerals, and this applies to the whole of the description.

The communication control apparatus 100 is mounted in each of a plurality of terminals. Through the communication control apparatus 100, wireless communication is performed between the terminals. Here, the communication control apparatus 100 is a main part for performing communication that is mounted in the terminal, and serves as a main part of a portable communication terminal such as a wireless LAN (Local Area Network) terminal or a mobile phone, a communication terminal mounted on a vehicle such as an ETC (Electronic Toll Collection System), or a stationary communication apparatus such as a infrastructure including a roadside device, a base station, or the like.

For the wireless communication, DSRC (Dedicated Short Range Communication) may be adopted, or a communication method used for a wireless LAN and a mobile phone may be adopted, or alternatively the IEEE 802.11p that has been studied in Europe and the United States, a communication method used for CALM (Communication Access for Land Mobile), or the like, may be adopted.

In this description, a first terminal that will be referred to as "own terminal" (first terminal) having the communication control apparatus 100 mounted thereon is focused. A plurality of terminals other than the "own terminal", each having the communication control apparatus 100 mounted thereon, will be referred to as "peripheral terminals" (second terminals). Among the peripheral terminals, a peripheral terminal for which confirming of whether or not transmission is performed (hereinafter, sometimes referred to as "carrier sensing") cannot be made by the own terminal will be referred to as "hidden terminal".

As shown in FIG. 1, the communication control apparatus 100 includes transmission means 1, reception means 2, transmission timing control means 3, information storage means 4, information processing means 5, and information input means 6. An example shown in FIG. 1 is based on the assumption that the information input means 6 is provided outside the communication control apparatus 100.

The transmission means 1 is means for performing wireless communication with a communication control apparatus that is similar to the communication control apparatus 100 and mounted in a peripheral terminal. The transmission means 1 transmits by the CSMA/CA scheme, to the peripheral terminal over a wireless space, terminal information generated by the information processing means 5 based on information such as the position and the speed of the own terminal that is stored in the information storage means 4. The transmission means 1 calculates and controls a random back-off time in the CSMA/CA scheme based on a back-off parameter that is set by the transmission timing control means 3.

Here, the terminal information represents all information of which transmission is requested by the terminal, such as terminal-related information including information of the speed, the adjusting speed, the position, the traveling direction, and the ON/OFF of a winker of the terminal, and application information the own terminal exchanges with the peripheral terminal.

The reception means 2 performs wireless communication with a communication control apparatus that is similar to the communication control apparatus 100 and mounted in a peripheral terminal. The reception means 2 receives terminal information transmitted from the peripheral terminal (hereinafter, sometimes simply referred to as "peripheral terminal information"), measures reception power at a time of the reception, and determines whether or not a communication band is being used (hereinafter, sometimes referred to as "busy") or not being used (hereinafter, sometimes referred to as "idle") and measures the percentage of busy time as a communication band utilization rate (an own terminal communication band utilization rate).

When requested to transmit the terminal information (transmission terminal information) from the information processing means 5, the transmission timing control means 3 obtains past own terminal communication band information from the information storage means 4, and determines whether or not to control a transmission timing. Additionally, the transmission timing control means 3 calculates a back-off parameter for the control, based on a past reception power information history that is obtained from the information storage means 4, and sets a back-off parameter with respect to the transmission means 1. Moreover, upon reception of notification of the back-off time calculated by the transmission means 1, the transmission timing control means 3 notifies the information processing means 5 of the received back-off time such that a transmission timing is shifted by the back-off time in and from the next period.

The information storage means 4 stores the terminal information that can be obtained from the information input means 6, the peripheral terminal information that is obtained from the peripheral terminal through wireless communication, the reception power information at a time of receiving the peripheral terminal information from the peripheral terminal, and information about the communication band utilization rate.

The information processing means 5 generates a terminal information transmission request that will be given from the own terminal to the peripheral terminal, obtains the terminal information from the information storage means 4 to generate transmission terminal information, and then transmits the transmission terminal information to the transmission timing control means 3. In response to a transmission timing change request from the transmission timing control means 3, the information processing means 5 changes a transmission request timing for requesting transmission terminal information that is periodically outputted. It is also possible that the information processing means 5 periodically outputs the transmission terminal information, occasionally outputs the transmission terminal information, or alternatively transmits the transmission terminal information in response to a request.

The information input means 6 detects information of a sensor, an external device, or the like, that is mounted in the own terminal, and stores the detected terminal information in the information storage means 4.

Figure 2:
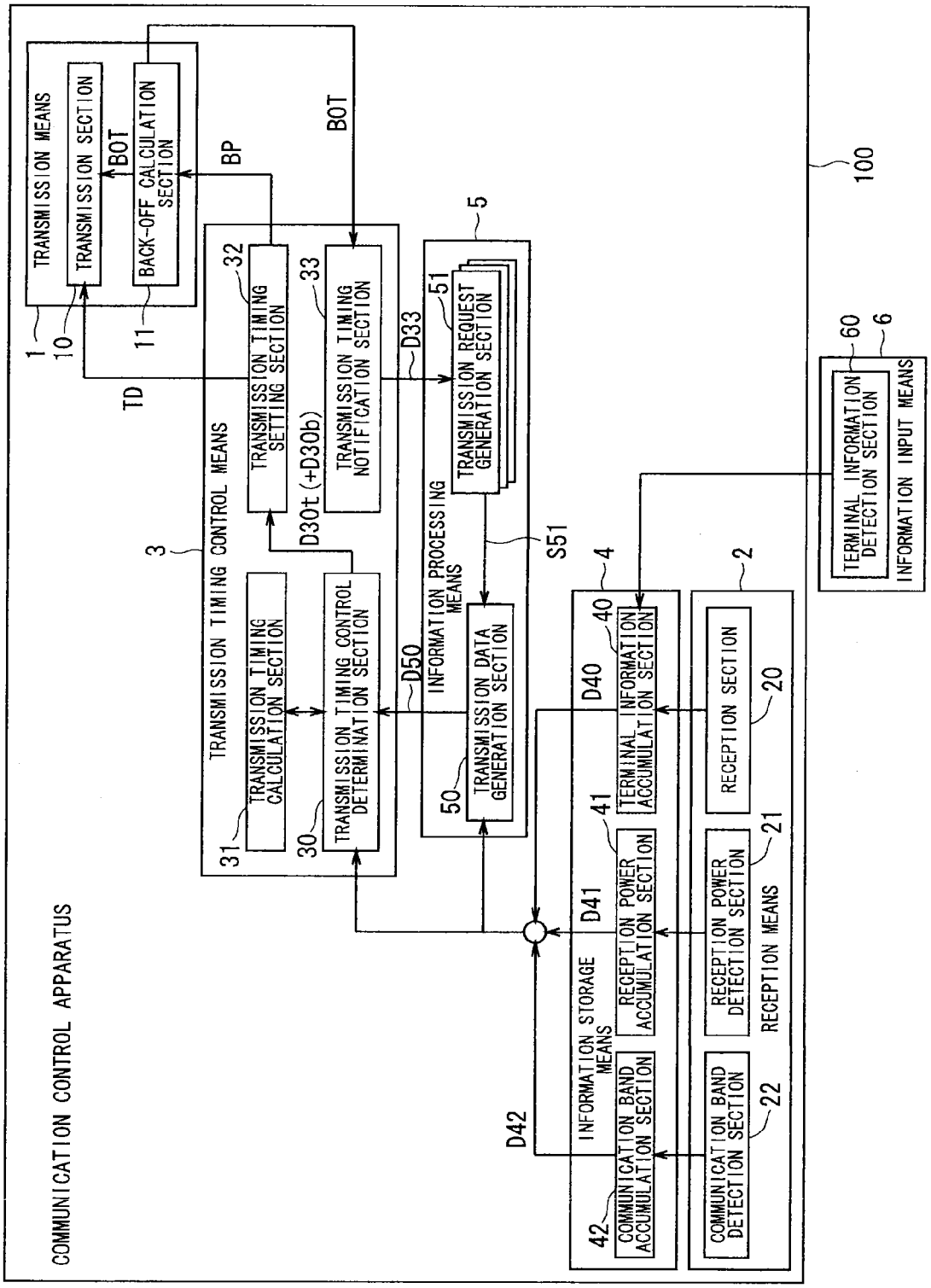
[FIG. 2] A block diagram showing a more detailed configuration of the communication control apparatus shown in FIG. 1.

FIG. 2 is a block diagram showing a more detailed configuration of the communication control apparatus 100 of FIG. 1. In FIG. 2, the same or equivalent parts of the configuration are denoted by the same reference numerals, and this applies to the whole of the description.

Functions of blocks 1 to 6 mounted in the communication control apparatus 100 will be described in detail with reference to FIG. 2.

The transmission means 1 includes a transmission section 10 and a back-off calculation section 11. The transmission section 10 receives transmission data TD from a transmission timing setting section 32, and performs broadcast transmission in which the transmission data TD is transmitted to all the peripheral terminals or unicast transmission (data transmission process) in which the transmission data TD is transmitted to a particular terminal. The transmission data TD is data that is set by the transmission timing setting section 32 based on terminal information D50 (transmission terminal information) generated by a transmission data generation section 50.

When transmitting the transmission data TD to the wireless space by using the CSMA/CA scheme, the transmission section 10 performs carrier sensing to confirm whether or not a transmission object peripheral terminal is in transmission. If it is not in transmission, the transmission section 10 transmits the transmission data TD. If it is in transmission, the transmission section 10 re-performs the carrier sensing after elapse of the random back-off time, and then transmits the transmission data TD. The back-off time used by the transmission section 10 is set by the back-off calculation section 11.

The back-off calculation section 11 receives a back-off parameter BP from the transmission timing setting section 32, and calculates and sets a back-off time BOT used when the transmission section 10 performs back-off. The back-off calculation section 11 notifies a transmission timing notification section 33 of the calculated back-off time BOT.

Here, the back-off parameter BP is not the random back-off time itself, but a Contention Window (hereinafter, abbreviated as "CW"), the minimum value of the CW (hereinafter, abbreviated as "CWmin") and the maximum value of the CW (hereinafter, abbreviated as "CWmax"), a slot time, a random value, the number of re-transmissions R, and the like.

The reception means 2 includes a reception section 20, a reception power detection section 21, and a communication band detection section 22. The reception section 20 receives data transmitted from the transmission section 10 of the peripheral terminal, and stores the received information (peripheral terminal information) in a terminal information accumulation section 40.

The reception power detection section 21 stores, in a reception power accumulation section 41, power (hereinafter, sometimes referred to as "reception power") and a reception time at a time when the data transmitted from the transmission section 10 of the peripheral terminal is received.

The communication band detection section 22 enables the own terminal to observe whether the wireless space is busy or idle, and stores, in a communication band accumulation section 42, the own terminal communication band utilization rate, which is represented as the percentage of busy time in a certain time period.

The wireless space is shared with the peripheral terminal. In a case where not only the own terminal but also any of the plurality of peripheral terminals is transmitting data, the wireless space is detected as being in a busy state. In general, the determination of whether or not the wireless space is "busy" is made such that, if power received by the own terminal is more than a certain level, the state is determined to be "busy".

The transmission timing control means 3 includes a transmission timing control determination section 30, a transmission timing calculation section 31, a transmission timing setting section 32, and a transmission timing notification section 33.

Upon reception of the transmission terminal information D50 from the transmission data generation section 50, the transmission timing control determination section 30 obtains information D42 about the communication band utilization rate from the communication band accumulation section 42, calculates a threshold value (hereinafter, sometimes referred to as "transmission offset") for determining whether or not to control the transmission timing, and determines whether or not to distribute the transmission timing (whether or not to control the back-off parameter).

Then, the transmission timing control determination section 30 obtains, from the reception power accumulation section 41, reception power and a reception time (last peripheral terminal reception time) with respect to the data that has been received at the time closest to the current time, and determines whether or not a time difference between a transmission request time, which is a time when the terminal information D50 has been transmitted from the transmission data generation section 50, and the last peripheral terminal reception time is within the transmission offset.

If the time difference is within the transmission offset, the transmission timing control determination section 30 requests the transmission timing calculation section 31 to calculates the back-off parameter, and upon reception of a result of the calculation from the transmission timing calculation section 31, outputs transmission terminal information D30$t$ and back-off parameter information D30$b$ to the transmission timing setting section 32. On the other hand, if the time difference is equal to or greater than the transmission offset, the transmission timing control determination section 30 outputs only terminal information D30$t$ to the transmission timing setting section 32.

The transmission timing calculation section 31 receives the reception power of reception from the peripheral terminal through the transmission timing control determination section 30, and then calculates the back-off parameter in accordance with the reception power, and returns a result of the calculation (back-off parameter) to the transmission timing control determination section 30. Concurrently with requesting the transmission timing calculation section 31 to calculate the back-off parameter, the transmission timing control determination section 30 also transmits the reception power of reception from the peripheral terminal to the transmission timing calculation section 31.

Upon reception of the terminal information D30$t$ from the transmission timing control determination section 30, the transmission timing setting section 32 outputs the transmission data TD including the terminal information D30$t$ to the transmission section 10, thereby requesting the transmission section 10 to perform the data transmission process for transmitting the transmission data TD. Upon reception of the back-off parameter information D30$b$ from the transmission timing control determination section 30, the transmission timing setting section 32 sets, to the back-off calculation section 11, the back-off parameter BP defined by the back-off parameter information D30$b$.

Upon reception of the calculated back-off time BOT from the back-off calculation section 11, the transmission timing notification section 33 notifies the transmission request generation section 51 of transmission timing notifying information D33 that defines a time when the back-off time BOT is received.

The information storage means 4 includes a terminal information accumulation section 40, a reception power accumulation section 41, and a communication band accumulation section 42.

The terminal information accumulation section 40 stores, as terminal information D40, own terminal terminal information that is detected by a terminal information detection section 60 of the information input means 6, and peripheral terminal information that is received from the peripheral terminal. The terminal information accumulation section 40 also manages the number of communicating terminals with the peripheral terminals, as the terminal information D40.

The reception power accumulation section 41 stores, as reception power information D41, information, corresponding to a certain past time period, of the reception power and the reception time of reception from the peripheral terminal, which are detected by the reception power detection section 21.

The communication band accumulation section 42 stores, as communication band utilization rate information D42, an average value through a certain past time period, a history through a certain past time period, and the like, of the communication band utilization rate in the wireless space, which is detected by the communication band detection section 22. The above-described terminal information D40, reception power information D41, and communication band utilization rate information D42 constitute stored information stored in the information storage means 4.

The information processing means 5 includes a transmission data generation section 50 and a transmission request generation section 51. Upon reception of a transmission request signal S51 from the transmission request generation section 51, the transmission data generation section 50 obtains the own terminal terminal information from the terminal information D40 of the terminal information accumulation section 40, and generates the transmission terminal information D50. The transmission data generation section 50 outputs the generated terminal information D50 to the transmission timing control determination section 30. The output of the terminal information D50 to the transmission timing control determination section 30 serves as a transmission request to the peripheral terminal by the terminal information D50.

The transmission request generation section 51 manages a timing for periodically transmitting the own terminal terminal information, and periodically generates the transmission request signal S51 or alternatively occasionally generates the transmission request signal S51 that indicates a terminal information transmission request to the peripheral terminal. In a case of periodically transmitting the own terminal terminal information, the transmission request generation section 51 changes the transmission request timing (timing for outputting the transmission request signal S51) in accordance with a request (transmission timing notifying information D33) from the transmission timing notification section 33. The transmission request generation section 51, in the form of an application, generates information transmission request, and more than one transmission request generation section 51 may be provided in the information processing means 5.

The information input means 6 includes a terminal information detection section 60. The terminal information detection section 60 detects information possessed by a sensor, an external device, and the like, that are mounted in the own terminal, and stores them as the own terminal terminal information in the terminal information accumulation section 40. The terminal information detection section 60 may periodically store the detected information in the terminal information accumulation section 40, or may store the detected information therein in a case where the terminal information is changed.

Figure 3:
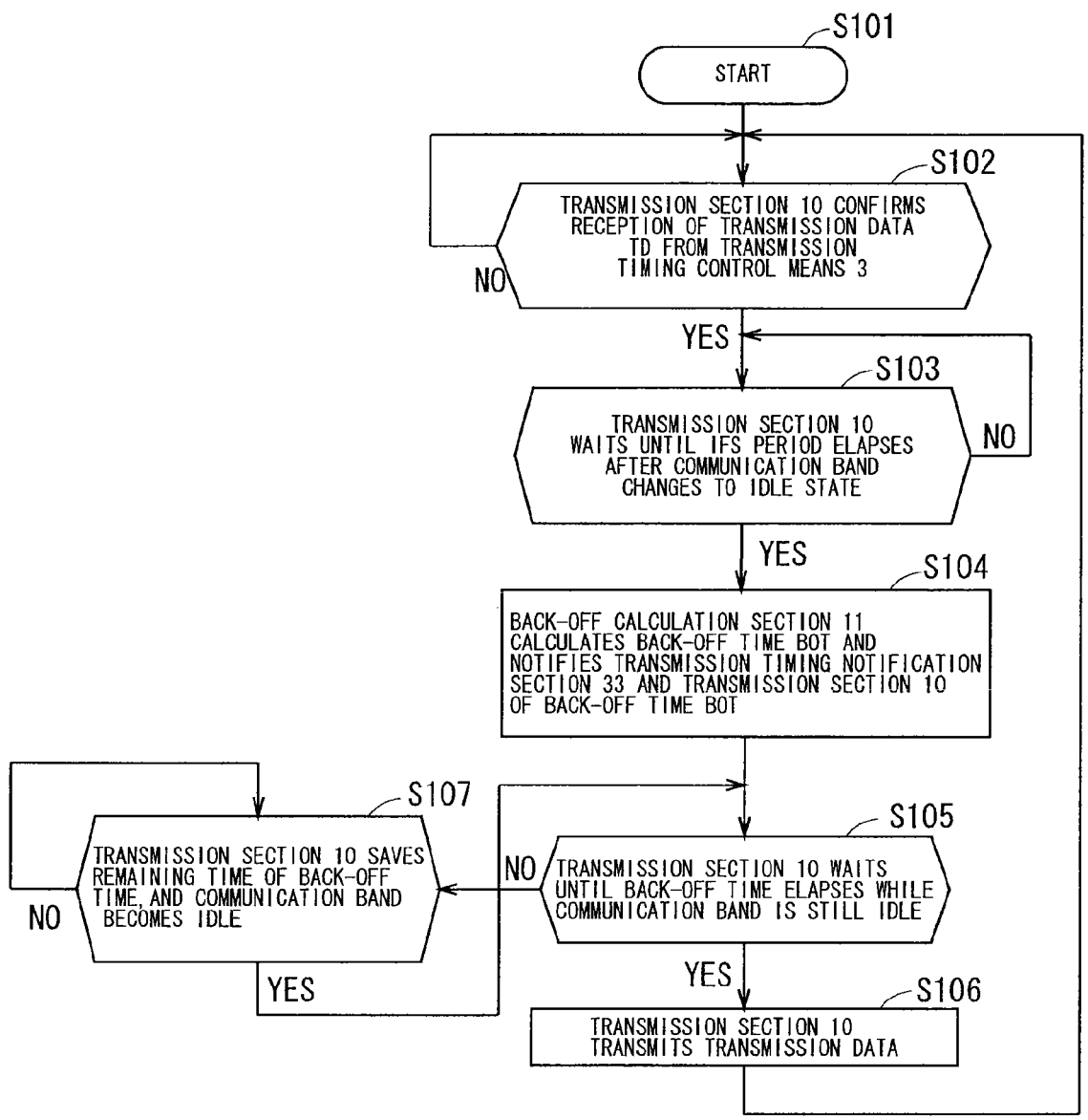
[FIG. 3] A flowchart showing an operation of transmission means of the communication control apparatus according to the embodiment 1.
Figure 5:
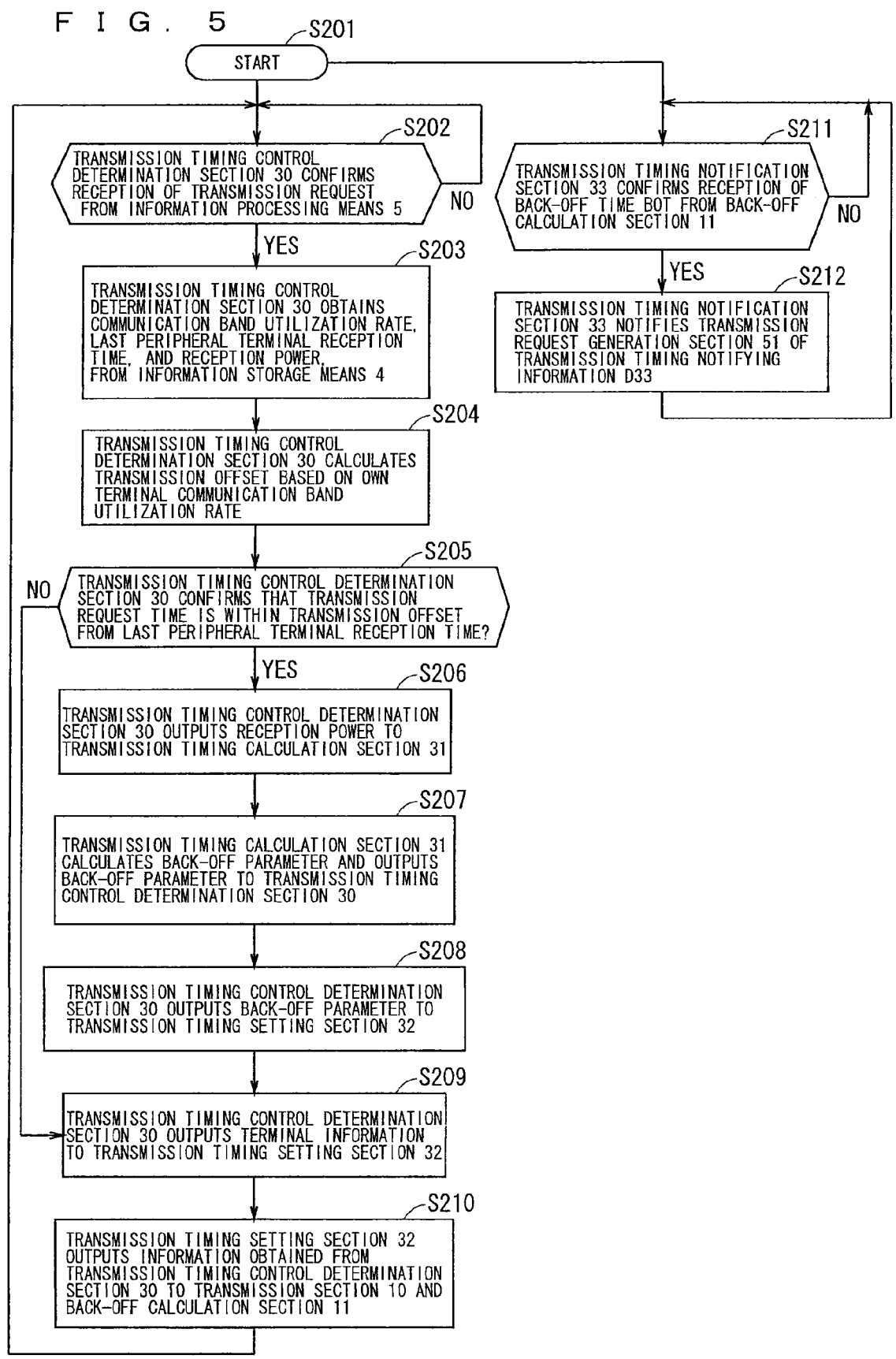
[FIG. 5] A flowchart showing an operation of transmission timing control means of the communication control apparatus according to the embodiment 1.
Figure 12:
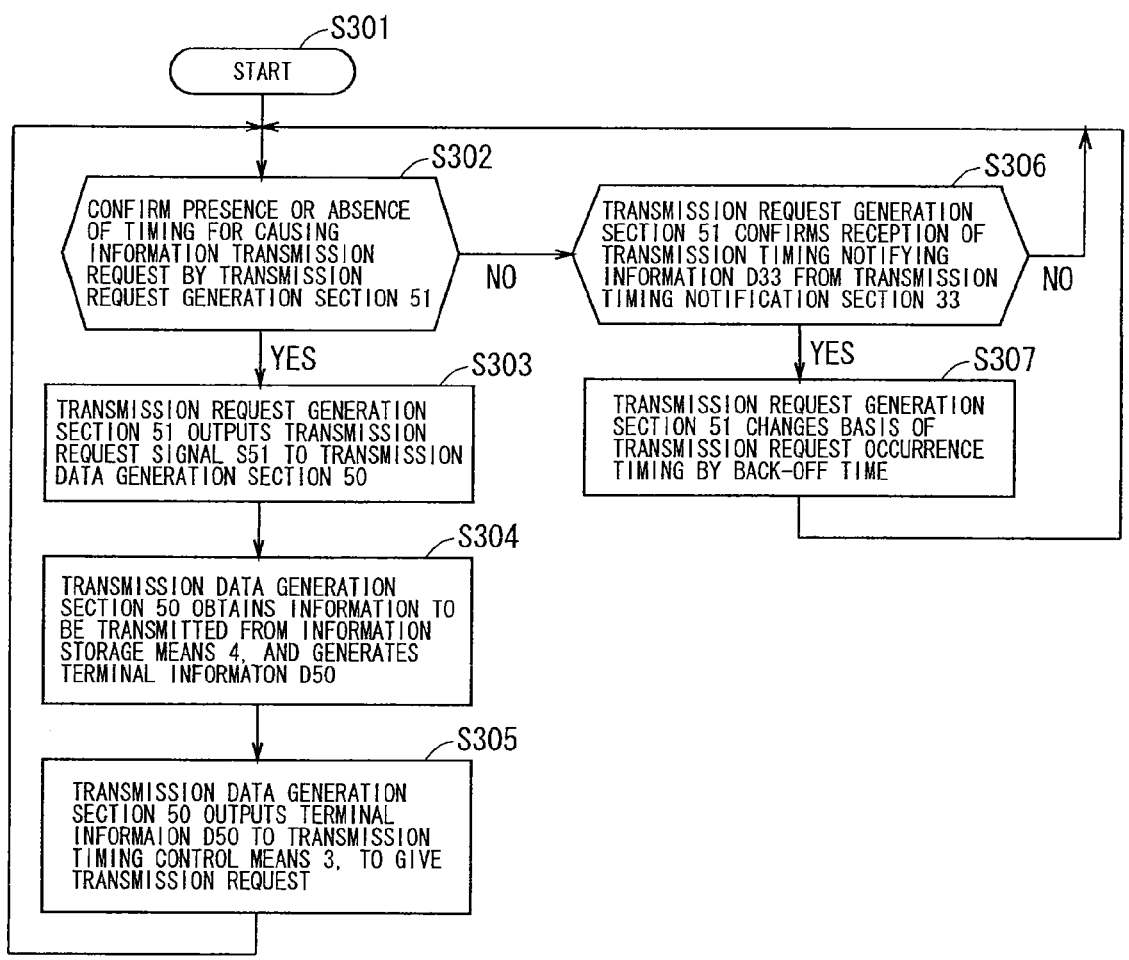
[FIG. 12] A flowchart showing an operation of information processing means of the communication control apparatus according to the embodiment 1.

Next, an operation of each means of the communication control apparatus according to the embodiment 1 will be described. FIG. 3, and FIGS. 5 and 12 which will be described later, are flowcharts showing operations of the respective means of the communication control apparatus according to the embodiment 1. Hereinafter, the operation of each means will be described.

FIG. 3 is a flowchart showing an operation of the transmission means 1 of the communication control apparatus according to the embodiment 1.

Referring to FIG. 3, the communication control apparatus is started in step S101, and then in step S102, the transmission section 10 of the transmission means 1 confirms reception of the transmission data TD (data transmission process request) from the transmission timing control means 3.

If no reception of the data transmission process request is confirmed in step S102, any reception of the data transmission process request is continuously waited for in step S102.

If a transmission request is received in step S102, then in step S103, the transmission section 10 performs carrier sensing in the wireless band to confirm whether the communication band is idle or busy, and waits until a certain time period (IFS: Inter Frame Space) elapses after a state changes into an idle state. In a case where the communication band is idle from the beginning in step S103, the transmission section 10 immediately waits until an IFS time period Tifs elapses. The waiting for the IFS time period Tifs is defined by the IEEE 802.11 Standard of the wireless LAN, and used for avoiding data collision or for controlling a data transmission sequence.

Then, in step S104, the back-off calculation section 11 calculates the back-off time BOT for a back-off control in the CSMA/CA scheme, and notifies the transmission section 10 and the transmission timing notification section 33 of the back-off time BOT.

Then, in step S105, in the idle state, the transmission section 10 keeps waiting until the back-off time BOT elapses while performing carrier sensing. After elapse of the back-off time BOT, the process moves to step S106.

On the other hand, if in step S105 the communication band becomes busy before elapse of the back-off time BOT, then in step S107, the transmission section 10 waits until the communication band becomes idle again while a remaining time of the back-off time is saved.

Then, in step S107, the transmission section 10 waits until the communication band becomes idle while performing carrier sensing, and if the communication band becomes idle (YES), the process moves to step S105 again. Then, in step S105, the transmission section 10 waits again until the remaining time of the back-off time BOT elapses. It may be also possible that, after it is determined to be YES in step S107, a step of waiting until the IFS time period Tifs elapses is performed similarly to step S103 and then the process returns to step S105.

In step S106 that is performed after the back-off time BOT elapses in step S105, the transmission section 10 transmits the transmission data TD, and then the process returns to step S102.

The above-described processes in steps S102 to S107 are repeatedly performed by confirming reception of the transmission request from the transmission timing control means 3.

Figure 4:
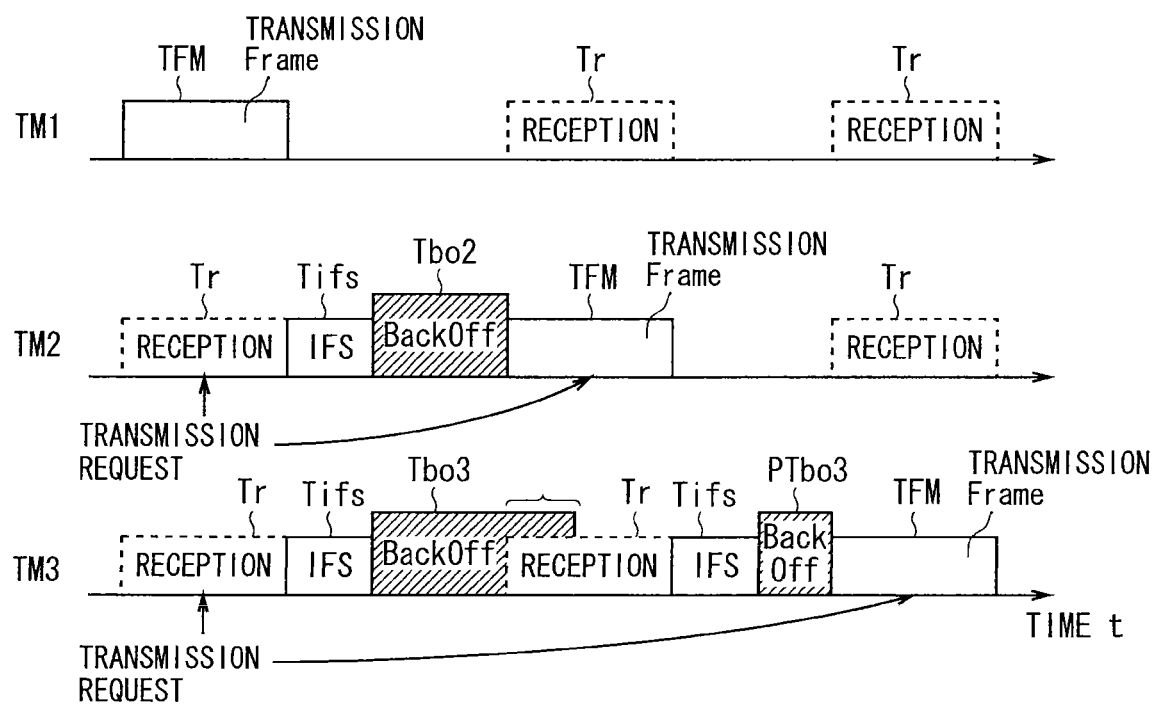
[FIG. 4] An explanatory diagram schematically showing an example of transmissions/receptions in three terminals.

FIG. 4 is an explanatory diagram schematically showing an example of transmission/reception in three terminals TM1 to TM3. An operation of the back-off control in the CSMA/CA scheme described in FIG. 3 will be described in detail with reference to FIG. 4. In FIG. 4, each terminal Tmi (i=any value of 1 to 3) is located at a position that can be found by carrier sensing.

Firstly, while the terminal TM1 is in transmission (in a time period of a transmission frame TFM), if data transmission process requests (outputs of the transmission data TD by the transmission timing setting section 32) are caused simultaneously from the terminals TM2 and TM3, the terminals TM2 and TM3 waits until the communication band becomes idle because the communication band is busy (reception time period Tr).

Then, when the terminal TM1 completes the transmission so that the terminals TM2 and TM3 can detect that the communication band becomes idle, the terminals TM2 and TM3 wait until the IFS time period Tifs elapses. After the IFS time period Tifs elapses, each of the terminals TM2 and TM3 randomly calculates a back-off time Tbo (Tbo2, Tbo3) and waits until the back-off time period Tbo elapses.

In FIG. 4, the back-off time period Tbo2 in the terminal TM2 elapses earlier, and thus the terminal TM2 starts transmission (proceeds to a time period of a transmission frame TFmR). In this case, in the terminal TM3, the communication band becomes busy (reception time period Tr) again, and thus the terminal TM3 waits until the communication band becomes idle again while saving a remaining back-off time period PTbo3. Then, after the terminal TM2 completes the transmission so that the communication band becomes idle, the terminal TM3 waits again for the IFS time period Tifs and the remaining back-off time period PTbo3, and then can start data transmission in a time period of a transmission frame TFM.

Next, the back-off control in the CSMA/CA scheme and the calculation of the back-off time, in step S106 of FIG. 3, will be described in detail.

In the CSMA/CA scheme, by a binary exponential back-off algorithm, a back-off time Tbackoff (corresponding to the back-off time BOT of FIG. 1 and the back-off time period Tbo of FIG. 4) is calculated by multiplying a slot time S by a random number value of the contention window CW, as indicated by the following expression (1).

[Math. 1]

$$T\text{backoff}=S \times \text{Rand}[0, CW] \quad (1)$$

The value of the CW is in a range from the minimum value CWmin to the maximum value CWmax, and is calculated by multiplying the minimum value CWmin by the number of re-transmissions R. Each time it is determined to be busy by the carrier sensing, the number of re-transmissions R is incremented by "1". The CW is represented as the following expression (2).

[Math. 2]

$$CW = CW\text{min} \times (2^R - 1) \quad (2)$$

(CWmin ≤ CW ≤ CWmax)

In the expression (1), Rand[0,CW] represents a function in which an integer value from 0 to CW is randomly selected at a uniform probability density.

In step S106, the back-off calculation section 11 designates the CWmin or the number of re-transmissions R as the back-off parameter BP from the transmission timing setting section 32, or directly designates the CW, and thereby can control the back-off time so as to increase or reduce the length thereof irrespective of the number of times it is determined to be busy.

FIG. 5 is a flowchart showing an operation of the transmission timing control means 3 of the communication control apparatus according to the embodiment 1.

Referring to FIG. 5, the communication control apparatus is started in step S201, and then in step S202, the transmission timing control determination section 30 of the transmission timing control means 3 waits until reception of the transmission request, which is caused by an output of the terminal information D50 from the transmission data generation section 50 of the information processing means 5, is confirmed. If no reception of the transmission request is confirmed in step S202, the process returns to step S202 to continue to confirm reception.

If reception of the transmission request is confirmed in step S202, then in step S203, the transmission timing control determination section 30 obtains the own terminal communication band utilization rate that is detected by the own terminal, and a reception time (hereinafter, sometimes referred to as "last peripheral terminal reception time" at which the last reception from the peripheral terminal occurs, and reception power. The own terminal communication band utilization rate is obtained from the communication band utilization rate information D42 of the information storage means 4. The reception time and reception power are obtained from the reception power information D41.

Then, in step S204, the transmission timing control determination section 30 calculates the transmission offset based on the own terminal communication band utilization rate thus obtained.

FIG. 6 is an explanatory diagram showing, in the form of a table, the relationship between the (own terminal) communication band utilization rate and the transmission offset. Referring to FIG. 6, the transmission timing control determination section 30 calculates the transmission offset based on the (own terminal) communication band utilization rate thus obtained.

Then, in step S205, the transmission timing control determination section 30 confirms whether or not a time (transmission request time) at which the transmission request is received from the information processing means 5 is within the transmission offset time based on the aforementioned last peripheral terminal reception time as a starting point.

If the transmission request time is within the transmission offset time from the last peripheral terminal reception time in step S205, then in step S206, the transmission timing control determination section 30 transmits, to the transmission timing calculation section 31, the reception power of reception from the peripheral terminal, which is together with the back-off parameter BP calculation instruction.

Then in step S207, the transmission timing calculation section 31 calculates the back-off parameter BP based on the reception power of reception from the peripheral terminal, which is received from the transmission timing control determination section 30.

Figures 7, 8:
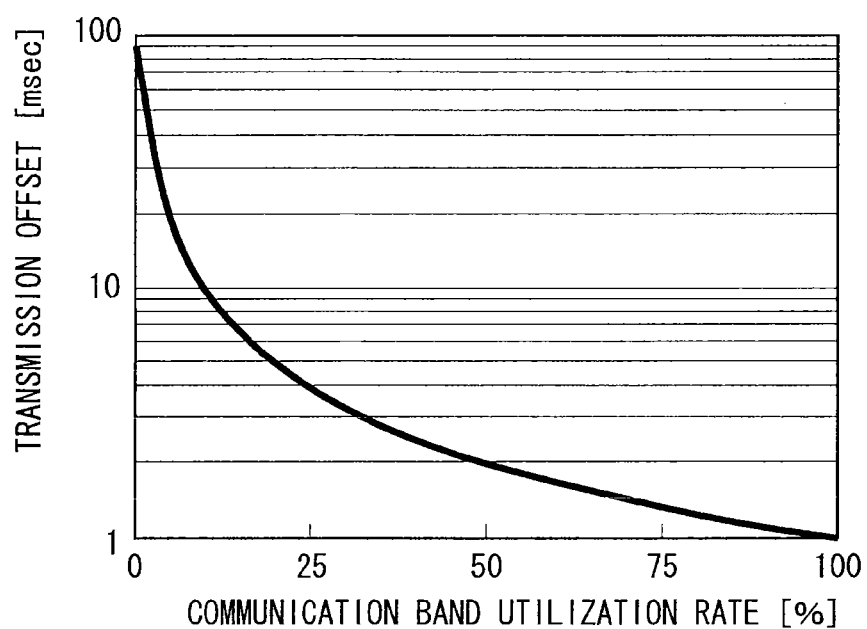
[FIG. 7] An explanatory diagram showing, in the form of a table, the relationship between reception power and a back-off parameter.
[FIG. 8] A graph showing the relationship between the communication band utilization rate and the transmission offset.

FIG. 7 is an explanatory diagram showing, in the form of a table, the relationship among the reception power, the CWmin and CWmax serving as the back-off parameter BP, and the number of re-transmissions R.

Referring to FIG. 7, the transmission timing calculation section 31 calculates, as the back-off parameter BP, the CWmin, the CWmax, and the number of re-transmissions R, based on the reception power, and sends it to the transmission timing control determination section 30.

Then, in step S208, the transmission timing control determination section 30 receives the calculated back-off parameter BP from the transmission timing calculation section 31, and then outputs it, as the back-off parameter information D30b indicating the back-off parameter BP, to the transmission timing setting section 32.

In step S209, the transmission timing control determination section 30 outputs the terminal information D30t that is based on the terminal information D50 to the transmission timing setting section 32.

In step S210, the transmission timing setting section 32 outputs the received terminal information D30t, as the transmission data TD, to the transmission section 10. Moreover, in a case where the back-off parameter information D30b is received, the transmission timing setting section 32 sets the back-off parameter BP to the back-off calculation section 11. Then, a transmission timing process that has been executed in response to the reception of the transmission request from the information processing means 5 is completed, and the process returns to step S202 again.

On the other hand, if the transmission request time is equal to or greater than the transmission offset time from the aforementioned last peripheral terminal reception time in step S205, the process moves to step S209 without performing steps S206 to S208, and the transmission timing control determination section 30 transmits the terminal information D30t to the transmission timing setting section 32.

Accordingly, in step S210 that is performed after steps S205 and S209, the transmission timing setting section 32 outputs the received terminal information D30t, as the transmission data TD, to the transmission section 10, but does not output the back-off parameter BP to the back-off calculation section 11.

On the other hand, the transmission timing notification section 33, which is operating concurrently with the transmission timing control determination section 30 and the transmission timing setting section 32 after the communication control apparatus is started in step S201, waits until reception of the back-off time BOT that is randomly calculated by the back-off calculation section 11 is confirmed.

If no reception of the back-off time BOT is confirmed in step S211, the transmission timing notification section 33 continues to confirm reception of the back-off time BOT.

If reception of the back-off time BOT is confirmed in step S211 (YES), then in step S212, the transmission timing notification section 33 outputs the transmission timing notifying information D33 that is based on the received back-off time BOT to the transmission request generation section 51, to set the transmission request timing (timing for outputting the transmission request signal S51) of the transmission request generation section 51. Then, the process is completed.

The processes in steps S202 to S210 are repeatedly performed each time reception of the transmission request from the information processing means 5 is confirmed. The processes in steps S211 and S212 are continuously performed after the staring in step S201.

The transmission offset Toffset used in step S204 may be managed in the form of a list as shown in FIG. 6, or alternatively may be calculated by using the following expression (3a) based on an (own terminal) communication band utilization rate O and the transmission period Ti, may be calculated by using the following expression (3b) so as to be uniformly distributed in the transmission period based on the transmission period Ti and the number of communicating terminals N obtained from the terminal information accumulation section 40, or may be calculated by using any other information.

[Math. 3]

$$Toffset = Ti[\text{msec}]/O \quad (3a)$$

$$Toffset = Ti[\text{msec}]/N \quad (3b)$$

FIG. 8 is a graph showing the relationship between the communication band utilization rate O and the transmission offset. FIG. 8 shows the relationship between the communication band utilization rate and the transmission offset in a case where the transmission period Ti is set to be 100 msec in the expression (3a) mentioned above.

The back-off parameter calculated in step S207 may be managed in the form of a list as shown in FIG. 7. Alternatively, the CW may be directly calculated instead of the CWmin, CWmax, and R, or the slot time S may be controlled to be set to the back-off calculation section 11.

Figure 9:
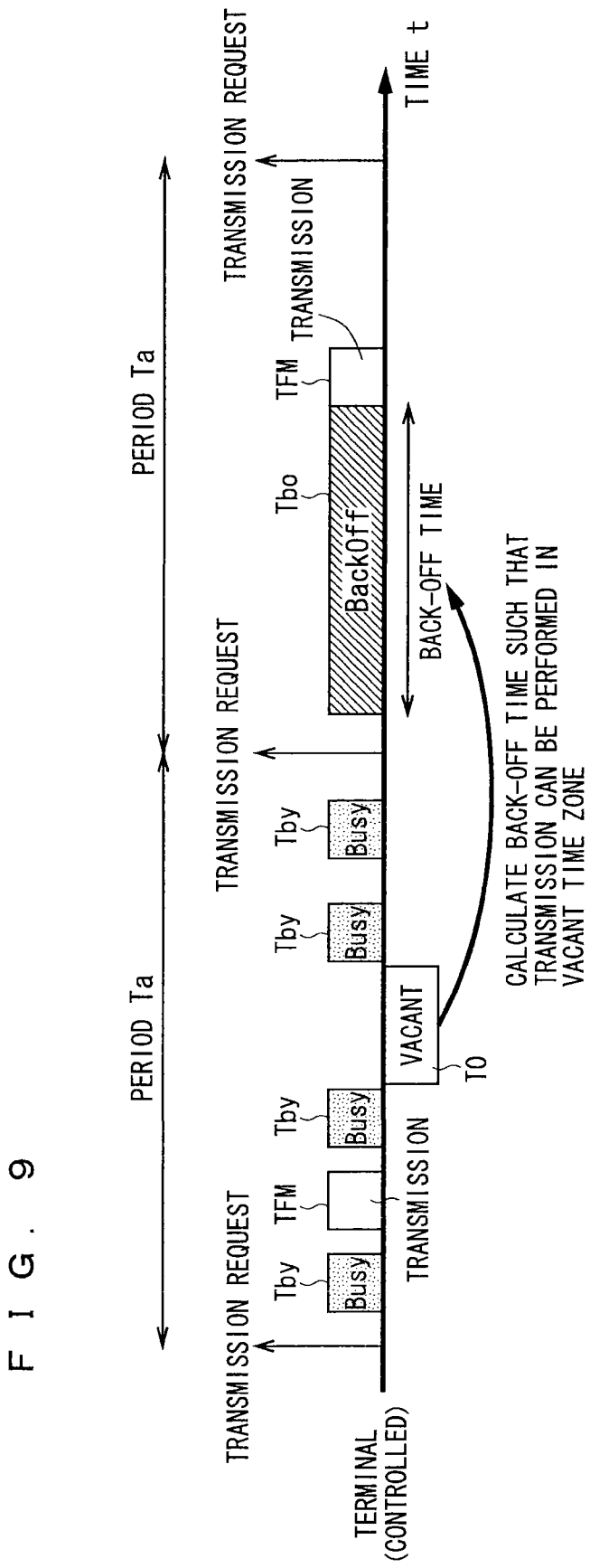
[FIG. 9] An explanatory diagram schematically showing an example of calculation of a back-off time using a past reception history.

FIG. 9 is an explanatory diagram schematically showing an example of calculation of the back-off time BOT using a past reception history. In step S207, as shown in FIG. 9, the CW may be calculated and set by using the past reception history such that transmission can be performed at a timing when the communication band is idle. That is, in FIG. 9, in consideration of a plurality of busy time periods Tby and a vacant time period T0 during the transmission frame TFM in a past period Ta, the back-off parameter BP such as the CW may be set in such a manner that the back-off time period Tbo can be set so as to ensure the transmission frame TFM in a time zone corresponding to the vacant time period T0 in the next period Tb.

FIG. 10 is an explanatory diagram showing, in the form of a table, the relationship between a relative distance to the peripheral terminal and the contention window CW.

In step S207, referring to FIG. 10, the calculation of the back-off parameter may be controlled such that the contention window CW can be small with respect to the peripheral terminal located nearer and can be large with respect to the peripheral terminal located farther based on not only the reception power but also the relative distance (or the positional relationship) to the peripheral terminal, and then the transmission timing may be changed based on the resulting back-off parameter BP.

FIG. 11 is an explanatory diagram schematically showing a specific example of the transmission timing control illustrated in FIG. 5. Hereinafter, with reference to FIG. 11, the transmission timing control performed by the transmission timing control means 3 illustrated in FIG. 5 will be described in detail.

FIG. 11 shows, as an example, a case where there are two terminals TM1 and TM2 and the terminal TM2 causes a transmission request after receiving data from the terminal TM1.

As shown in FIG. 11, in response to the transmission request, the terminal TM1 performs the data transmission process in the transmission frame time period TFM, from a time t1 coming after elapse of the IFS time period Tifs and a back-off time period Tbo1.

On the other hand, in the terminal TM2, a time period starting from the time t1 and corresponding to the transmission frame time period TFM of the terminal TM1 is the reception time period Tr. That is, in the terminal TM2, t1 is a reception start time t1. In the reception time period Tr starting from the reception start time t1 that is a time when the terminal TM2 starts reception from the terminal TM1, reception power PrB of reception of received data can be obtained.

After the reception start time t1, at a transmission request occurrence time t2, the terminal TM2 assumes that a transmission request has occurred. Here, the (own terminal) communication band utilization rate at the transmission request occurrence time t2 is defined as O(t).

Firstly, the terminal TM2 calculates the transmission offset Toffset based on the communication band utilization rate O(t) at the transmission request occurrence time t2 with reference to the list shown in FIG. 6. The terminal TM2 determines whether a time difference between the reception start time t1 and the transmission request occurrence time t2 is smaller or greater than the transmission offset time (corresponding to step S205 of FIG. 5).

In a case of "Toffset≥(t2−t1)" (YES in step S205), it is determined that the transmission timing is close, and a back-off parameter calculation control (processes in steps S206 to S208) is performed for changing the transmission timing.

In the back-off parameter calculation control, the back-off parameter BP is calculated based on the reception power PrB (obtained in step S206) of reception from the terminal TM1 (step S207), and the back-off parameter BP is outputted to the transmission timing setting section 32 (step S208).

As a result, as shown in FIG. 11, after elapse of the IFS time period Tifs and the back-off time period Tbo2, the terminal TM2 performs the data transmission process for transmitting the transmission frame TFM.

Then, based on the CWmin, the CWmax, and the number of re-transmissions R that are included in the back-off parameter BP thus calculated, the back-off calculation section 11 randomly calculates the back-off time.

On the other hand, in a case of "Toffset<(t2−t1)" (NO in step S205), the back-off parameter calculation control is not performed (moving to step S209).

FIG. 12 is a flowchart showing an operation of the information processing means 5 of the communication control apparatus according to the embodiment 1.

Referring to FIG. 12, the communication control apparatus is started in step S301, and then the presence or absence of an occurrence timing concerning whether or not to cause the transmission request signal S51 by the transmission request generation section 51 of the information processing means 5 is confirmed. If it is determined that there is the aforementioned occurrence timing in step S302 (YES), the process moves to step S303. If it is determined that there is not the aforementioned occurrence timing (NO), the process moves to step S306.

In a case of YES in step S302, then in step S303, the transmission request generation section 51 outputs the transmission request signal S51 to the transmission data generation section 50.

Then, in step S304, the transmission data generation section 50 obtains the own terminal terminal information from the terminal information D40 of the terminal information accumulation section 40, and generates the transmission terminal information D50.

Then, in step S305, the data generation section 50 outputs the generated terminal information D50, and thereby giving a transmission request to the transmission timing control determination section 30. Then, returning to step S302, the presence or absence of the next occurrence timing is confirmed.

On the other hand, in a case of NO in step S302, then in step S306, the transmission request generation section 51 confirms reception of the transmission timing notifying information D33 from the transmission timing notification section 33.

If no reception of the transmission timing notifying information D33 is confirmed in step S306 (NO), the process returns to step S302, and reception of the occurrence timing is confirmed.

On the other hand, if reception of the transmission timing notifying information D33 is confirmed in S306 (YES), then in step S307, the transmission request generation section 51, which is periodically generating the transmission request signal S51, changes a current basis of the transmission request occurrence timing such that it is delayed by the back-off time that is defined in the transmission timing notifying information D33. Then, the process returns to step S302.

Each time the occurrence timing is confirmed, the processes in steps S302 to S305 are repeatedly performed.

Here, in step S303, as described above, the transmission request generation section 51 may give a transmission request, and the transmission data generation section 50 may generate the transmission data based on the information of the terminal information accumulation section 40. Alternatively, in a possible variation, the transmission request generation section 51 may supply information to be transmitted, together with the transmission request, to the transmission data generation section 50, and the transmission data generation section 50 may generate the terminal information D50 based on these kinds of information.

Figure 13:
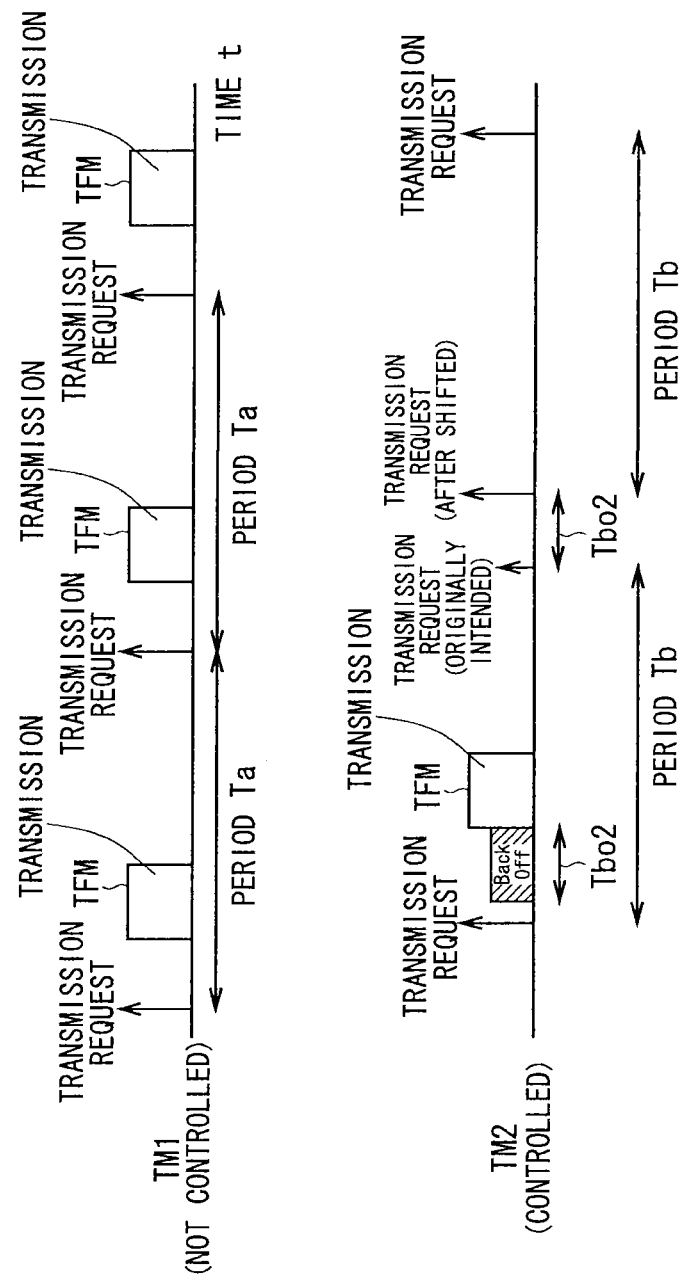
[FIG. 13] An explanatory diagram schematically showing a specific example in a process of step S307 illustrated in FIG. 12.

FIG. 13 is an explanatory diagram schematically showing a specific example in the process of step S307 illustrated in FIG. 12. In a case shown in FIG. 13, the terminal TM1 does not perform the transmission timing control of FIG. 12 and the terminal TM2 performs the transmission timing control.

In the terminal TM1, the transmission request occurs in the certain period Ta, and a timing at which the transmission request is reissued is not changed irrespective of the back-off time.

In the terminal TM2, the transmission request occurs in the certain period Tb, and if the transmission timing notifying information D33 that defines the back-off time period Tbo2 is received from the transmission timing notification section 33, then at a timing of occurrence of the next transmission request, the transmission request is caused at a time shifted by a time corresponding to the back-off time period Tbo2. That is, the transmission timing is changed by a time corresponding to the back-off time period Tbo2. Subsequently, a timing of giving the transmission request comes at intervals of a certain period (the period Tb+the back-off time period Tbo2) while the time shifted by the back-off time period Tbo2 serves as the basis. Then, each time a control of the transmission request timing is made by the transmission timing notifying information D33, a transmission request time is repeated shifted. In a case where the back-off time is greater than the transmission period, the transmission request timing does not have to be shifted.

In the configuration illustrated in this embodiment, the transmission timing control means 3 and the transmission means 1 for operating the CSMA/CA scheme are separated from each other. However, the function of the transmission timing control means 3 may be incorporated into the transmission means 1, for the operation in the CSMA/CA scheme.

In this embodiment, the transmission request generation section 51 is included in the communication control apparatus 100. However, the function for determining the transmission request timing using the transmission request signal S51 or the like may be separated from the communication control apparatus 100, and information concerning the transmission request which includes a signal corresponding to the transmission request signal S51 may be received from the outside.

In this embodiment, as an opportunity for performing the transmission timing control, the (own terminal) communication band utilization rate O(t) is used to calculate the transmission offset time. However, instead of the communication band utilization rate O(t), the number of communicating terminals, the number of receptions within a certain time period, the communication band utilization rate detected by the peripheral terminal, the kind or priority of data to be transmitted, the type of an application that requests the transmission, or the like, may be used to calculate the transmission offset.

In this embodiment, the transmission timing control is performed on the operation in the CSMA/CA scheme. However, the transmission timing control may be applied to not only the CSMA/CA scheme but also other access schemes used in an autonomous distribute system, such as the CSMA scheme, the ALOHA scheme, and the Persistent scheme.

In this embodiment, the transmission timing is determined in the own terminal, for the control. However, a calculated shifting time by which the transmission timing is to be shifted may be notified to the peripheral terminal, or alternatively a change request may be given.

For example, in a communication control apparatus (corresponding to the communication control apparatus 100) of each peripheral terminal, a process may be performed for setting a back-off time based on the aforementioned shifting time that is included in the peripheral terminal information of the terminal information D40 of the terminal information accumulation section 40.

In this embodiment, for the calculation of the back-off parameter BP used for the transmission timing control, the reception power of the last reception is used to calculate the CWmin, the CWmax, and the number of re-transmissions R. However, instead of the last reception power, a past history in a certain time period, an average reception power, a difference from the last reception time, the positional relationship with the peripheral terminal, the speed and the traveling direction of the terminal, the priority of data to be transmitted, or the like, may be used to calculate the back-off parameter BP.

Here, the communication control apparatus 100 may be a movable communication terminal such as a wireless LAN terminal and a mobile phone, or alternatively may include a fixed communication apparatus such as a base station.

In the communication control apparatus 100 of the embodiment 1, the transmission timing control means 3 is capable of a variable control of at least one back-off parameter BP.

Therefore, the back-off time can be controlled to change the transmission timing, independently of the carrier sensing performed for confirming whether or not at least one peripheral terminal is in communication. This exerts an effect that the possibility of collision of packets containing the transmission data, or the like, with at least one peripheral terminal can be reduced.

As described above, in the communication control apparatus 100 according to this embodiment, the transmission timing control determination section 30 determines whether the transmission timing is close or remote in accordance with the state of congestion of the communication band. This can reduce the possibility of packet collision in consideration of a situation of the communication band in the CSMA/CA scheme.

Moreover, in a case where the transmission timing is distributed, the transmission timing control determination section 30 does not perform the control (does not change the transmission timing), and thereby the distributed state can be maintained. As a result, the possibility of packet collision can be kept low.

Here, to be specific, the "case where the transmission timing is distributed" means the "case where a time difference between the transmission request time, at which the transmission request from the transmission data generation section 50 occurs, and the last reception time is equal to or greater than the transmission offset".

In the communication control apparatus 100 according to the this embodiment, the back-off parameter BP is set by using the reception power at the time when reception from the peripheral terminal occurs in the transmission timing calculation section 31. Therefore, in the CSMA/CA scheme, the possibility of packet collision with a neighborhood terminal or a hidden terminal can be reduced. This is because a "terminal with small reception power" is likely to be located farther, and is a terminal that is likely to be a hidden terminal in further.

Furthermore, the transmission timing calculation section 31 largely shifts the transmission timing with respect to the terminal with small reception power. In other words, the reception power and the transmission timing are negatively correlated with each other (predetermined correlation). As a result, the probability of packet collision with a terminal that will be a hidden terminal in future can be reduced. Thus, CSMA characteristics can be improved.

Furthermore, since the back-off parameter BP is set by the transmission timing setting section 32, that is, by the outside of the transmission means 1, the CSMA/CA scheme operation of an existing device is not influenced. Therefore, this embodiment is directly applicable to a communication apparatus including existing transmission means.

Furthermore, since the back-off parameter BP is set based on the relative distance to the peripheral terminal, a transmission timing with respect to a remote terminal that is likely to be a hidden terminal can be shifted, thus improving the communication quality.

In the communication control apparatus 100 according to this embodiment, the back-off time calculated by the back-off calculation section 11 is notified to the transmission timing notification section 33, and the transmission timing notification section 33 notifies the transmission request generation section 51 of the transmission timing notifying information D33. Thereby, in a case where data is periodically transmitted, the shift of the transmission timing can be started from a new period. Therefore, even after the transmission timing is controlled, the probability of packet collision can be reduced, thus improving the communication quality.

In the communication control apparatus 100 according to this embodiment, the transmission timing is distributed in accordance with the state of congestion of the communication band. This can avoid keeping the busy state continuously in the communication band. Thus, a transmission delay time can be shortened, even in a case of transmitting information other than the periodically transmitted information.

Here, to be specific, "the transmission timing is distributed in accordance with the state of congestion of the communication band" is achieved by, as shown in FIG. 7, setting the transmission offset based on the communication band utilization rate O(t).

In the communication control apparatus 100 according to this embodiment, as the back-off parameter BP used for the back-off control, the CWmin, the CWmax, and the number of re-transmissions R are changed. This can increase the probability of avoiding packet collision as compared with the standard CSMA/CA scheme, thus improving the communication reliability. Moreover, since the contention window CW of the back-off parameter BP can be also directly designated, the transmission timing can be freely controlled. Thus, by causing the transmission while estimating a time zone where no packet collision will occur, the communication quality can be improved.

In the communication control apparatus 100 according to this embodiment, in consideration of a past communication band usage situation, the back-off time is controlled to change the transmission timing such that transmission occurs in a time zone that is not used. This can reduce the probability of packet collision, thus improving the communication quality.

<Embodiment 2>

An embodiment 2 according to the present invention will be described with reference to FIGS. 14 to 17. In this embodiment 2, a description will be mainly given on the assumption that a communication control apparatus is mainly included in a terminal that is mounted in a vehicle.

Figure 14:
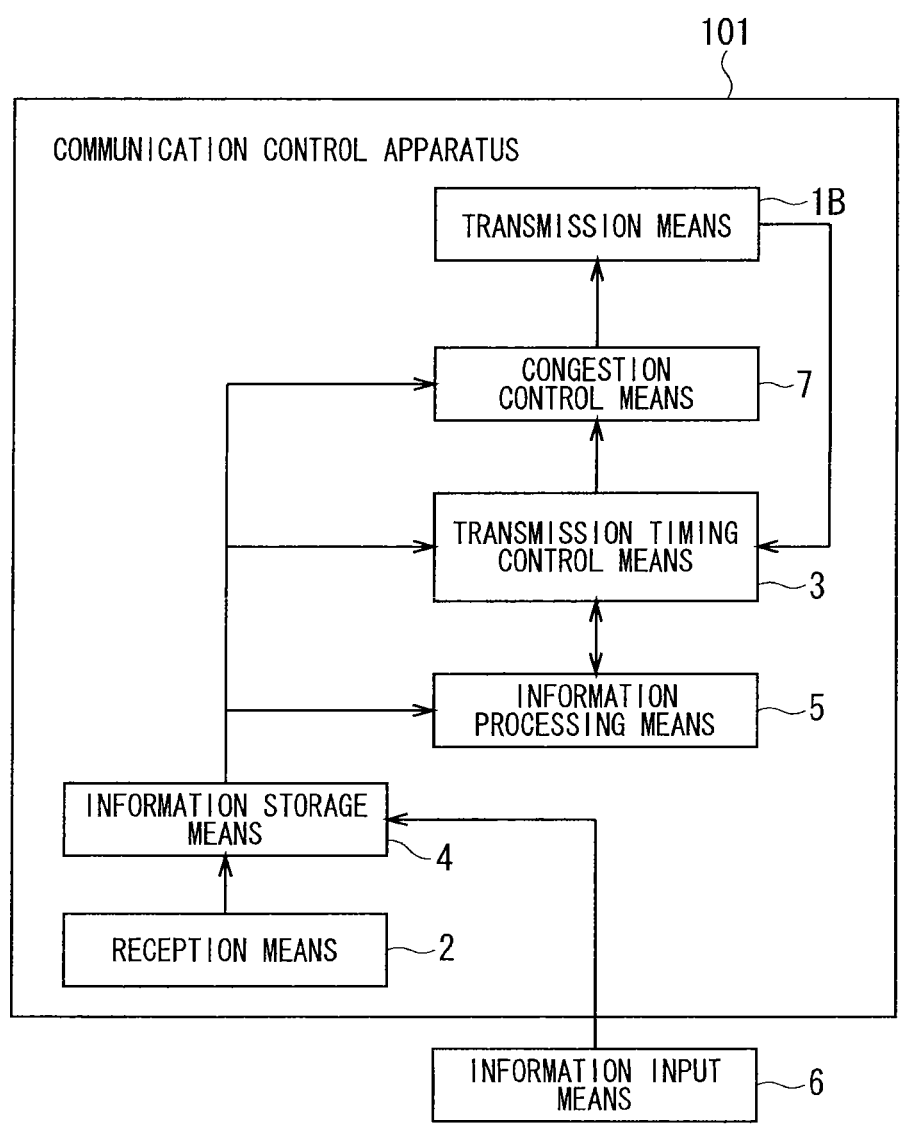
[FIG. 14] A block diagram showing an outline configuration of a communication control apparatus according to an embodiment 2 of the present invention.
Figure 15:
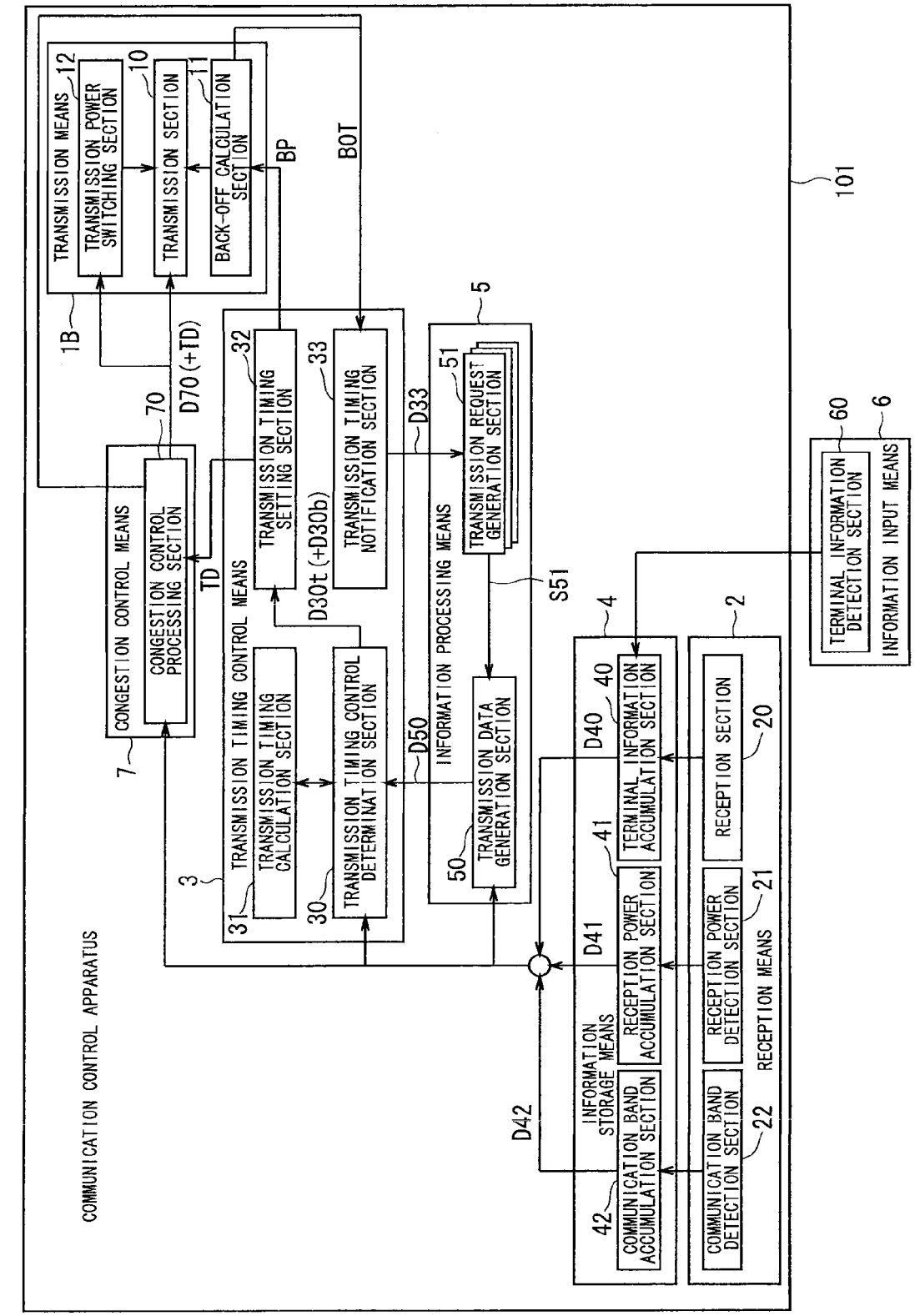
[FIG. 15] A block diagram showing a detailed configuration of the communication control apparatus according to the embodiment 2 of the present invention.

FIG. 14 is a block diagram showing an outline configuration of a communication control apparatus 101 according to the embodiment 2 of the present invention. FIG. 15 is a block diagram showing a detailed configuration of the communication control apparatus 101 according to the embodiment 2 of the present invention. The same part as that of the embodiment 1 is denoted by the same reference numeral, and a detailed description thereof is omitted as appropriate.

Similarly to the embodiment 1 of FIG. 1, the embodiment 2 of the present invention includes transmission means 1B (corresponding to the transmission means 1), the reception means 2, the transmission timing control means 3, the information storage means 4, the information processing means 5, and the information input means 6. The embodiment 2 is different from the embodiment 1 in terms of further including congestion control means 7 as shown in FIG. 14.

Additionally, in the communication control apparatus 101 of the embodiment 2, the transmission means 1B further includes a transmission power switching section 12, which is a point different from the transmission means 1 of the communication control apparatus 100 of the embodiment 1. Moreover, the congestion control means 7 includes a congestion control processing section 70.

The transmission means 1B of the embodiment 2 sets transmission power by the transmission power switching section 12, in accordance with a request (congestion control information D70) from the congestion control means 7.

In the embodiment 2, the information storage means 4 also stores the number of peripheral terminals in communication, and transmission power, a transmission period, and a (peripheral terminal) communication band utilization rate that are received from the peripheral terminal, and the like.

In the embodiment 2, the information processing means 5 changes the transmission request timing (timing for outputting the transmission request signal S51) that defines a transmission period, in accordance with a request from the transmission timing control means 3.

In the embodiment 2, the congestion control means 7 uses the information D40 to D42 obtained from the information storage means 4, to control the transmission power and the transmission period and to output, to the transmission means 1B, congestion control information D70 that instructs continuous transmission of the transmission data TD of which transmission has been requested.

As described above, in the embodiment 2, the transmission means 1B further includes the transmission power switching section 12.

The transmission power switching section 12 sets the transmission power to the one that is instructed (requested) by the congestion control information D70 outputted from the congestion control processing section 70, and switches the transmission power of the transmission section 10 such that the transmission data TD is transmitted over the wireless space with the transmission power being set.

In the embodiment 2, the transmission timing setting section 32 outputs the transmission data TD that is based on the terminal information D50 received from the transmission data generation section 50, not to the transmission section 10 but to the congestion control processing section 70, to give the transmission request.

As described above, the congestion control means 7 of the embodiment 2 includes the congestion control processing section 70. The congestion control processing section 70 receives an input of the transmission data TD, as the data transmission process request, from the transmission timing setting section 32, and then generates the congestion control information D70 based on various information outputted from the information storage means 4, and outputs the congestion control information D70 to the transmission section 10 and the transmission power switching section 12. Here, the various information include, for example, the own terminal communication band utilization rate and the peripheral terminal communication band utilization rate that are obtained from the communication band utilization rate information D42 of the communication band accumulation section 42, and the transmission power, the transmission period, the reception sensitivity, and the number of consecutive transmissions that are calculated by the congestion control processing section 70. The congestion control processing section 70 also outputs the transmission data TD to the transmission section 10, to give the data transmission process request to the transmission means 1B.

Moreover, the congestion control processing section 70 outputs the congestion control information D70 based on the own terminal communication band utilization rate and the peripheral terminal communication band utilization rate, the positions and speeds of the own and peripheral terminals, and the like, from the terminal information D40, the reception power information D41, and the communication band utilization rate information D42 stored in the information storage means 4. The congestion control information D70 is information for controlling the transmission power, for replicating the transmission data TD to continuously transmit it, and for controlling the back-off time BOT that is a period in which the transmission request is to be caused by the transmission request generation section 51.

Here, the congestion control information D70 indicates the communication band utilization rate that is detected by the own terminal, the transmission power, the transmission period, the reception sensitivity, the number of consecutive transmissions that are set by the own terminal, the priority of information, and the like.

In the embodiment 2, the transmission timing notification section 33 notifies the transmission request generation section 51 of the transmission timing notifying information D33 that defines a transmission period of which setting is requested, based on the congestion control information D70 received from the congestion control processing section 70.

In the embodiment 2, the terminal information accumulation section 40 stores, as the terminal information D40, not only the peripheral terminal information received from the peripheral terminal, but also the transmission power, the transmission period, the reception sensitivity, the number of consecutive transmissions, and the like, that are included in the congestion control information received from the peripheral terminal.

In the embodiment 2, the communication band accumulation section 42 stores, as the communication band utilization rate information D42, the peripheral terminal communication band utilization rate that is included in the peripheral terminal information received from the peripheral terminal.

In the embodiment 2, based on the transmission timing notifying information D33 that is received from the congestion control processing section 70 via the transmission timing notification section 33, the transmission request generation section 51 recognizes the transmission period of which setting is requested, and switches a period in which the transmission request signal S51 is to be outputted.

Figure 16:
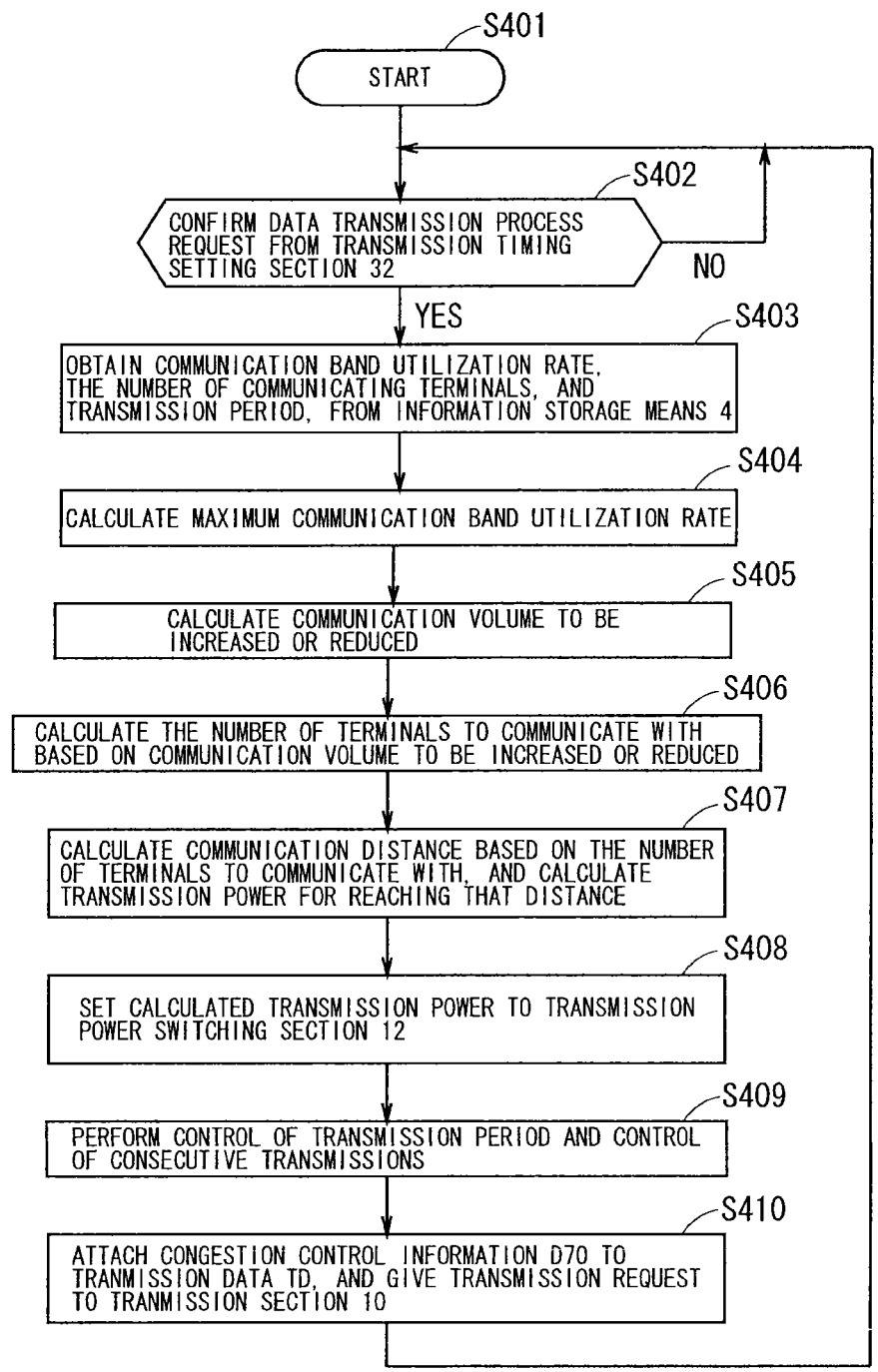
[FIG. 16] A flowchart showing an operation of a congestion control processing section of the communication control apparatus according to the embodiment 2.
Figure 17:
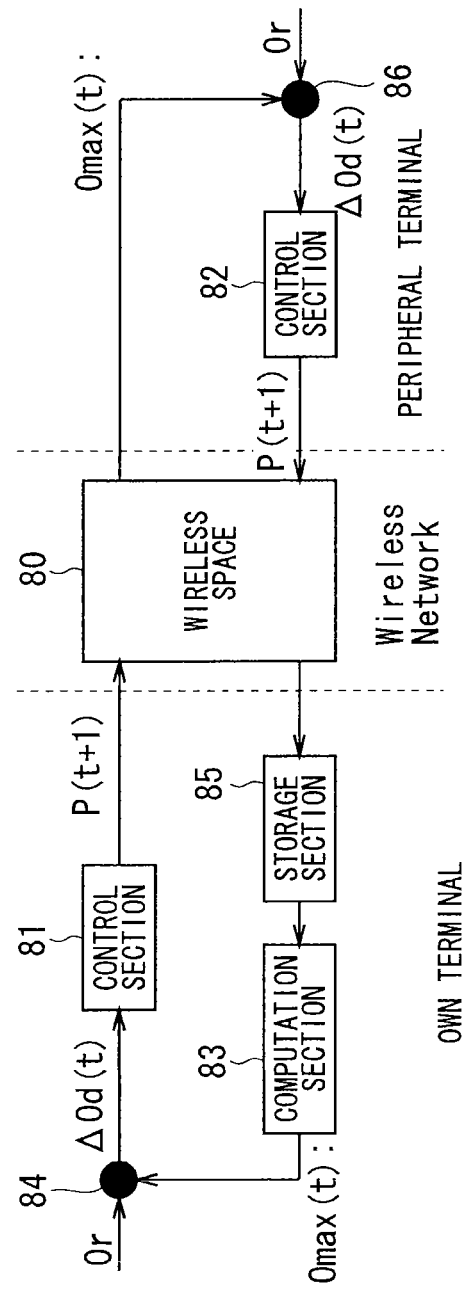
[FIG. 17] An explanatory diagram showing a configuration of a feedback control in a congestion control processing section shown in FIG. 15.

In the following, an operation of the communication control apparatus 101 according to the embodiment 2 will be described in detail. FIG. 16 is a flowchart showing an operation of the congestion control processing section 70 of the communication control apparatus according to the embodiment 2. FIG. 17 is an explanatory diagram showing a configuration of a feedback control in the congestion control processing section 70.

Referring to FIG. 16, the communication control apparatus is started in step S401, and then in step S402, the congestion control processing section 70 of the congestion control means 7 confirms the presence or absence of a data transmission process request, which is an output of the transmission data TD from the transmission timing setting section 32.

If no reception of the data transmission process request is confirmed in step S402 (NO), then in step S402, the congestion control processing section 70 waits until reception of the data transmission process request is confirmed.

On the other hand, if reception of the data transmit transmission request is confirmed in step S402, then in step S403, the congestion control processing section 70 obtains the own terminal communication band utilization rate and the peripheral terminal communication band utilization rate, from the communication band utilization rate information D42 of the communication band accumulation section 42 of the information storage means 4, and then obtains the number of communicating terminals and the transmission period of the own terminal, from the terminal information D40 of the terminal information accumulation section 40.

Then, in step S404, in accordance with the following expression (4), the congestion control processing section 70 selects a maximum communication band utilization rate Omax(t), based on an own terminal communication band utilization rate Oi(t) and a peripheral terminal communication band utilization rate Oj(t).

[Math. 4]

$$O\max(t) = \max[Oj(t)] \quad (4)$$

$$(j=0, 1, \ldots N)$$

In the expression (4), t represents a time step, and N represents the number of peripheral terminals with which the own terminal i can communicate. When j=0, it means the own terminal communication band utilization rate Oi(t). When j≥1, it means the peripheral terminal communication band utilization rate Oj(t).

Then, in step S405, the congestion control processing section 70 applies a PID control to a deviation $\Delta Od(t)$ between the communication band utilization rates, in order to converge the maximum communication band utilization rate Omax(t) to a target communication band utilization rate Or, and, in accordance with the following expression (5), calculates a communication traffic volume Q(t) [%] by which the communication traffic in the entire network is to be increased or reduced.

[Math. 5]

$$Q(t) = K_p \Delta O_d(t) + K_i \sum_{\tau=0}^{t} \Delta O_d(\tau) + K_d [\Delta O_d(t) - \Delta O_d(t-1)] \quad (5)$$

$$= K_p \left[ \Delta O_d(t) + \frac{1}{T_i} \sum_{\tau=0}^{t} \Delta O_d(\tau) + T_d \{\Delta O_d(t) - \Delta O_d(t-1)\} \right]$$

In the various parameters shown in the expression (5), Kp represents a proportional gain, Ki represents an integral gain, Kd represents a differential gain, Ti represents an integral time, and Td represents a differential time.

Figures 18, 19:
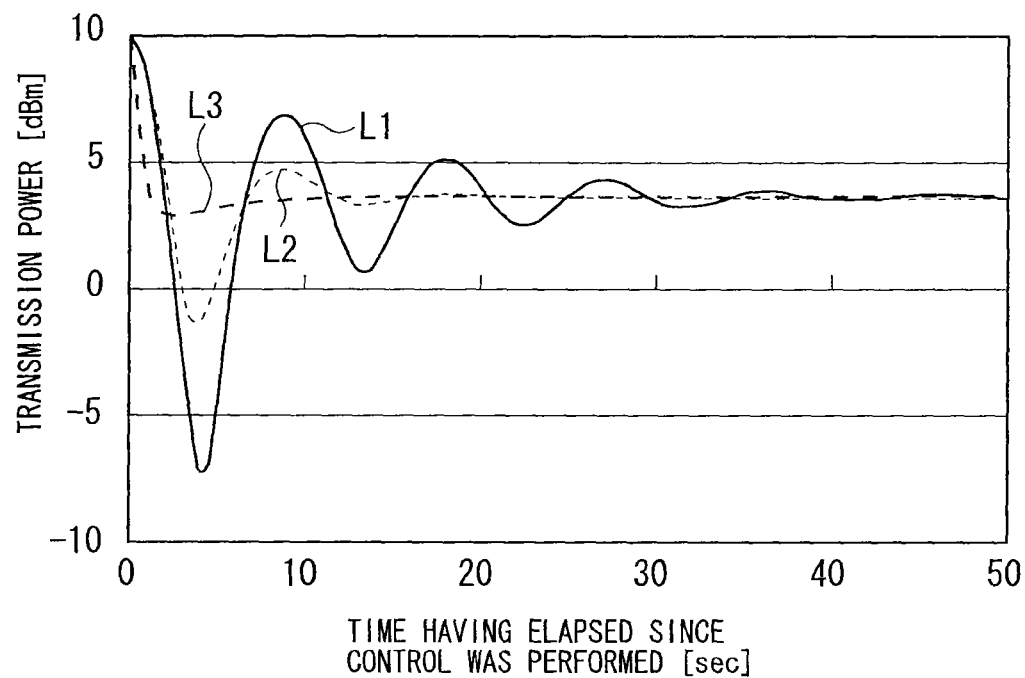
[FIG. 18] A graph showing a variation in transmission power based on a time having elapsed since a control was performed.
[FIG. 19] An explanatory diagram showing, in the form of a table, the relationship between a target communication band utilization rate and the number of consecutive transmissions.

FIG. 18 is a graph showing a variation in the transmission power based on a time having elapsed since a control was performed. By freely setting the various parameters of the expression (5) mentioned above, the speed of convergence to the target value can be controlled as shown in FIG. 18.

FIG. 18 shows a graph in which three patterns are set to the value of the proportional gain Kp as an example, in a case where the integral time Ti and the differential time Td are fixed. The proportional gain Kp is set greater gradually from the transmission power variations L1 to L3.

As shown in FIG. 18, as the proportional gain Kp is set greater, the convergence is made earlier, and as the Kp is set smaller, a time is required until convergence because vibration occurs before the convergence.

Then, in step S406, the congestion control processing section 70 determines that the calculated communication traffic volume Q(t) is divided among the number n of terminals with which the own terminal is communicating, and by using the following expression (6a), calculates a traffic volume q(t) [%] by which one terminal has to increase or reduce the communication traffic. Then, by using the following expression (6b), the congestion control processing section 70 calculates the number x of terminals with which the communication has to be reduced in order that the own terminal satisfies the communication traffic volume q(t).

[Math. 6]

$$q(t) = Q(t)/n \quad (6a)$$

$$x = q(t) \times Tx/B \quad (6b)$$

In the expression (6b), B represents a communication band utilization rate B=S/R (data size S[bit], transmission speed R[bps]) that is occupied when one terminal performs one transmission, and Tx represents a transmission period of a vehicle that is communicating with the own terminal.

Then, in step S407, in order to reduce the communication area with respect to, among the peripheral terminals communicating with the own terminal, x terminals that are remote from the own terminal, the congestion control processing section 70 calculates a distance d[m] that allows communication with (n−x) terminals that are close to the own terminal, and in accordance with the following expression (7), calculates transmission power P(t+1) [dBm] whose reach distance is the distance d[m].

[Math. 7]

$$P(t+1) = Pr - Gt - Gr - L(d) - Lo \quad (7)$$

$$\text{where } L(d) = \left(\frac{4\pi d}{\lambda}\right)^2$$

In the expression (7), P(t) represents the transmission power at a time t, Pr represents the reception sensitivity [dBm], Gt represents a transmission antenna gain [dBi], Gr represents a reception antenna gain [dBi], L(d) represents a radio wave propagation loss [dB] in the distance d, Lo represents other increase-decrease elements such as a cable loss, a error correction gain, and a fading margin. π represents the ratio of the circumference of a circle to its diameter, and λ represents a wavelength.

Then, in step S408, the congestion control processing section 70 outputs the congestion control information D70 indicating the calculated transmission power P(t+1) to the transmission power switching section 12, and thereby cause the transmission power switching section 12 to perform a process for setting the transmission power P(t+1).

Additionally, in step S409, the congestion control processing section 70 sets the transmission period T(t+1) [msec] as indicated by the following expression (8), to control the transmission period, and controls consecutive transmissions with the target communication band utilization rate.

[Math. 8]

$$T(t+1) = T(t) + K_p \Delta O_d(t) + K_i \sum_{\tau=0}^{t} \Delta O_d(\tau) + K_d[\Delta O_d(t) - \Delta O_d(t-1)]$$
$$= T(t) + K_p[\Delta O_d(t) + \frac{1}{T_i} \sum_{\tau=0}^{t} \Delta O_d(\tau) + T_d\{\Delta O_d(t) - \Delta O_d(t-1)\}] \quad (8)$$

FIG. 19 is an explanatory diagram showing, in the form of a table, the relationship between the target communication band utilization rate and the number of consecutive transmissions. In the control of the consecutive transmissions in step S409, referring to FIG. 19, the consecutive transmissions can be controlled so as to set the number of consecutive transmissions.

Finally, in step S410, the congestion control processing section 70 attaches the congestion control information D70 indicating the communication band utilization rate, the transmission power, the transmission period, the reception sensitivity, the number of consecutive transmissions, and the like, together with the transmission data TD. At this time, based on the number of consecutive transmissions calculated in step S409, the transmission means 1B replicates the transmission data TD and continuously transmits it R times in total.

Although the maximum communication band utilization rate is used in the process of step S405, the PID control may be directly applied to the number of communicating terminals, the transmission power, and the like. Although the PID control is applied in step S405 of the embodiment 2, a control other than the PID control, such as a feedback control or a feedforward control may be applied.

In step S405, the target communication band utilization rate may be calculated based on the CSMA characteristics in order to ensure a desired communication quality, or alternatively an appropriate value may be freely set.

In step S409, the PID control may be applied to the transmission period as well as the transmission power, or another control may be applied thereto.

In step S409, in accordance with a requested communication quality, the communication distance, and the set value of the transmission power, the control of the transmission period and the control of the consecutive transmissions may be performed in combination or only the transmission power control may be performed without any combination.

Hereinafter, to facilitate the understanding of the operation of the congestion control processing section 70 shown in FIG. 16, a description will be given in conjunction with FIG. 17. Firstly, separately from a flow process of FIG. 16, the own terminal communication band utilization rate Oi(t) that can be detected in a wireless space 80 (channel) of FIG. 17 is periodically measured and stored in a storage section 85 of FIG. 17. Here, the storing can be performed each time information (such as the number of communicating terminals and the peripheral terminal communication band utilization rate Oj(t)) is received from the peripheral terminal.

Then, if the data transmission process request occurs in step S402 of FIG. 16, the following process is started.

Firstly, in step S403 of FIG. 16, a computation section 83 of FIG. 17 obtains the terminal communication band utilization rates Oi(t) and Oj(t), and the number of communicating terminals n, from the storage section 85.

Then, in step S404 of FIG. 16, the computation section 83 calculates the maximum communication band utilization rate Omax(t) based on the own terminal communication band utilization rate Oi(t) and the peripheral terminal communication band utilization rate Oj(t) that are obtained via the storage section 85 from the wireless space 80 of FIG. 17.

In step S405 of FIG. 16, a calculation section 84 of FIG. 17 calculates the ΔOd(t) based on the Omax(t) that is calculated by the computation section 83 and the target value Or that is held in advance. Moreover, a control section 81 of FIG. 17 calculates a communication volume Q(t) by which the ΔOd(t) is increased or reduced. Since the ΔOd(t) is used for the next time step (t+1), it is held. The various parameters Kp, Ki, and Kd are held within the control section 81.

Moreover, in steps S406 and S407 of FIG. 16, the process is performed in the control section 81 of FIG. 17. In correspondence with step S406, the q(t) is calculated based on the communication volume Q(t) to be increased or reduced, and the number x of terminals with which communication has to be made is calculated based on the q(t).

Additionally, in correspondence with step S407, the control section 81 calculates the communication distance d based on the number x of terminals, and, based on the communication distance d, calculates the transmission power P(t+1) that allows reaching over this distance. Here, in calculating P(t+1), the position information is obtained from the peripheral terminal information, and the relative distance to the own terminal is calculated. The parameters R, Pr, Gt, Gr, Lo, λ, and the like, are held in the control section 81.

Finally, in step S408 of FIG. 16, the transmission power P(t+1) calculated by the control section 81 of FIG. 17 is set to the transmission power switching section 12, an in step S410, the transmission data TD (terminal information) is transmitted over the wireless space 80 of FIG. 17. Here, a control section 82 and the calculation section 86 of the peripheral terminal perform the same controls as those of the control section 81 and the calculation section 84.

Although the control section 81 of FIG. 17 can calculate the transmission period T(t+1) similarly to steps S404 and S405, no particular correspondence with FIG. 17 is made. The number of consecutive transmissions is also not related to FIG. 17, and it is assumed that the number of consecutive transmissions is set based on the target communication band utilization rate as shown in FIG. 19.

In the process performed by the congestion control processing section 70, in a case where the number of communicating terminals is large, if only the transmission power control is used to avoid congestion and to ensure the communication quality, there is a possibility that the transmission power will be reduced and the communication area is narrowed. Therefore, it may be acceptable that, for example, when the transmission power takes a specific threshold value, the control of the transmission period is started, and when the transmission period takes a specific threshold value, the control of consecutive transmissions is started. In the process performed by the congestion control processing section 70, the transmission power is controlled to thereby suppress the communication band utilization rate to be low, and therefore a vacancy occurs in the communication band. Therefore, it may be acceptable that the control of consecutive transmissions is applied when the communication band utilization rate takes a specific threshold value or less.

Moreover, the congestion control processing section 70 may control the transmission power and the transmission period and control the consecutive transmissions, in consideration of the positional relationship with the peripheral terminal, the traveling direction, and the relative position.

In this embodiment, it is assumed that the processes performed by the transmission timing control determination section 30 and the transmission timing calculation section 31 are the same as those of the embodiment 1. However, by using the congestion control information D70 that is received from the peripheral terminal, the transmission timing may be controlled based on the peripheral terminal communication band utilization rate.

As described above, the communication control apparatus 101 according to this embodiment includes the congestion control processing section 70. Therefore, even in a case where the number of communication terminals increases, communication congestion can be avoided. This exerts an effect that packet collision can be avoided without reducing the effect of the transmission timing control.

In the communication control apparatus 101 of this embodiment, whether or not to change the transmission timing is determined based on the state of congestion (peripheral terminal communication band utilization rate Oj(t)) that is detected by the peripheral terminal. This enables a control in consideration of a location that cannot be detected by the own terminal.

In the communication control apparatus 101 according to this embodiment, in a case where congestion occurs in the communication band, the feedback control is performed to control the transmission power to be low, increase the transmission period, and replicate and transmit the same data based on the number of consecutive transmissions. Thereby, the reliability of communication can be improved.

In the communication control apparatus 101 according to this embodiment, in a case where congestion occurs in the communication band, the transmission power is controlled to be low. When the transmission power reaches a specific threshold value, it is an opportunity for increasing the transmission period or performing the consecutive transmissions. Thereby, reduction of the communication area can be prevented and the communication area can be enlarged while the communication quality is kept high.

The communication control apparatus 101 according to this embodiment includes the congestion control processing section 70. Therefore, even in an intersection, an elevated road, and the like, where the number of communication terminals temporarily increases, the transmission power and the transmission period can be increased or reduced at a high speed. Thus, in various traffic environments, the communication control apparatus 101 can be used to ensure the communication quality.

<Embodiment 3>

An embodiment 3 according to the present invention will be described with reference to FIGS. 20 to 22. In this embodiment 3, a description will be given on the assumption that a communication control apparatus is mainly included in a terminal that is mounted in a vehicle.

Figure 20:
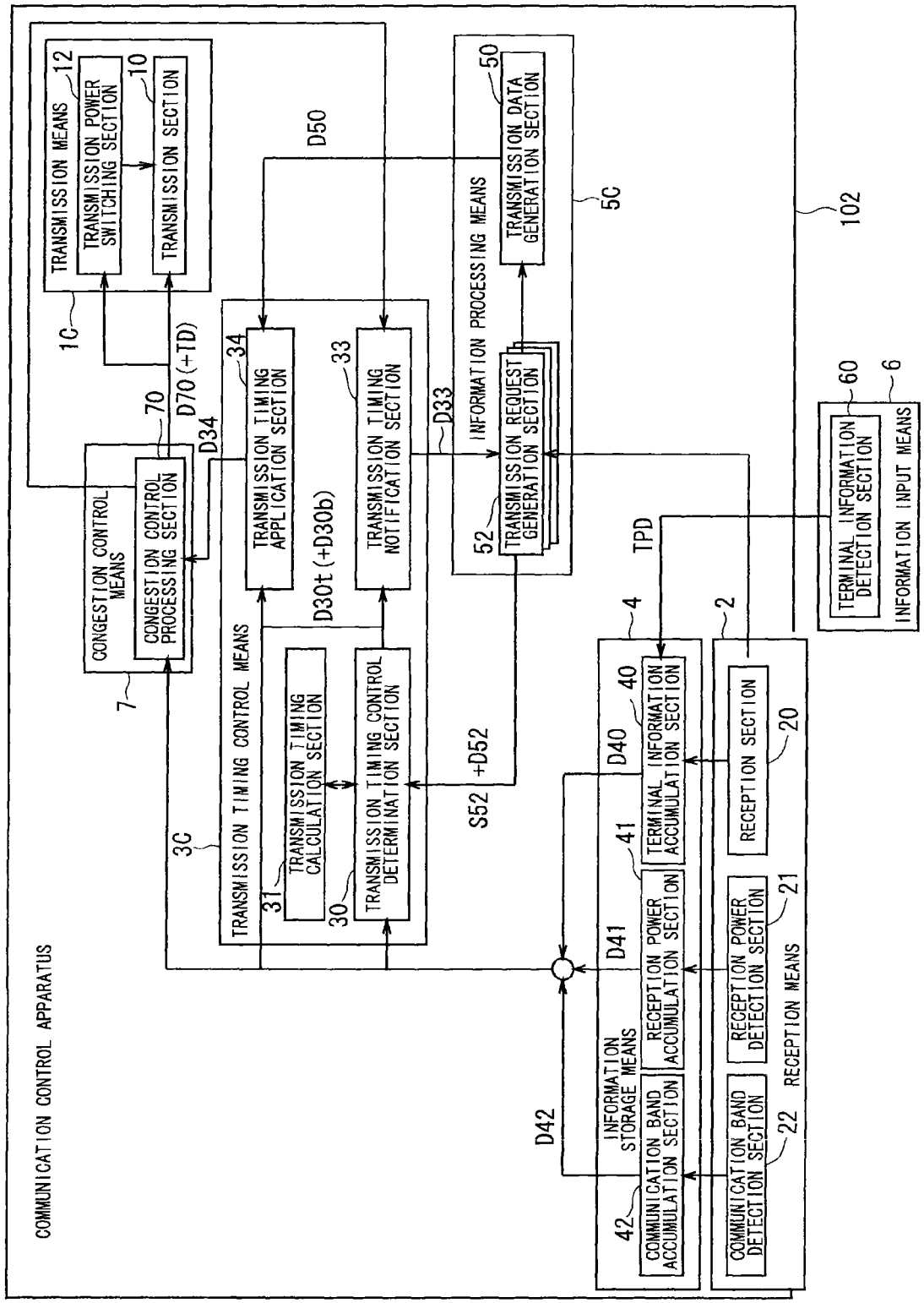
[FIG. 20] A block diagram showing a detailed configuration of a communication control apparatus according to an embodiment 3 of the present invention.

FIG. 20 is a block diagram showing a detailed configuration of a communication control apparatus 102 according to the embodiment 3 of the present invention. The same part as that of the embodiments 1 and 2 is denoted by the same reference numeral, and a detailed description thereof is omitted as appropriate.

A configuration of the embodiment 3 of the present invention, similarly to the configuration of the embodiment 2 shown in FIG. 15, includes transmission means 1C (corresponding to the transmission means 1B), the reception means 2, transmission timing control means 3C (corresponding to the transmission timing control means 3), the information storage means 4, information processing means 5C (corresponding to the information processing means 5), the information input means 6, and the congestion control means 7.

Accordingly, the communication control apparatus 102 of the embodiment 3 is different from that of the embodiment 2 shown in FIG. 15, in that the transmission timing control means 3C includes a transmission timing application section 34 instead of the transmission timing setting section 32 of the transmission timing control means 3, that the transmission means 1C does not include the back-off calculation section 11, that the transmission timing control means 3C does not include the transmission timing setting section 32, and that the information processing means 5C includes a transmission request generation section 52 instead of the transmission request generation section 51.

Since the transmission means 1C of the embodiment 3 does not include the back-off calculation section 11, the calculation of the back-off time is performed by the transmission section 10, and the back-off operation is performed in accordance with the standard CSMA/CA scheme.

In the embodiment 3, in a case where the transmission request generation section 52 receives a terminal information reception notification from the peripheral terminal, the transmission timing control determination section 30 of the transmission timing control means 3C determines whether or not to control the transmission timing in accordance with a request (transmission request signal S52) from the transmission request generation section 52.

In the embodiment 3, the transmission timing notification section 33 of the transmission timing control means 3C receives, from the transmission timing control determination section 30, the transmission shifting time by which the transmission timing is to be shifted, that is calculated by the transmission timing calculation section 31, and notifies the transmission request generation section 52 of the transmission timing notifying information D33 that defines the calculated transmission timing.

In the embodiment 3, if a transmission request is confirmed by receiving the terminal information D50 from the transmission data generation section 50, the transmission timing application section 34 of the transmission timing control means 3C transmits transmission timing control information D34 to the congestion control processing section 70. The transmission timing control information D34 is obtained by adding, to the terminal information D50, transmission timing control information made up of the transmission period held in the transmission request generation section 52 and the number of communicating terminals held in the terminal information agency accumulation section 40.

Here, the transmission timing control information D34 means a transmission period for the periodically transmitted information, the number of currently communicating terminals, an offset time for uniformly distributing the transmission period among the number of communicating terminals, and the like.

In the embodiment 3, if a peripheral terminal information reception notification is received from the reception section 20, the transmission request generation section 52 of the information processing means 5 notifies the transmission timing control determination section 30 of control information D52 as well as the transmission request signal S52. The control information D52 includes a reception time, a time until a next transmission, and a transmission period. In the following, assuming that the control information D52 is outputted simultaneously with the output of the transmission request signal S52, a description will be given mainly to the transmission request signal S52.

If requested to shift the transmission timing by a transmission time from the transmission timing notifying information D33 supplied from the transmission timing notification section 33, the transmission request generation section 52 shifts the next transmission timing, and is ready for an output of the next transmission request signal S52.

In the embodiment 3, the reception section 20 of the information processing means 5 receives not only the terminal information and the congestion control information that are transmitted by the peripheral terminal, but also the number of communicating terminals information of the peripheral terminal, and stores them in the terminal information accumulation section 40. Upon reception of information from the peripheral terminal, the reception section 20 notifies the transmission request generation section 52 of a time of the reception and reception power.

An operation of the communication control apparatus 102 according to the embodiment 3 will be described in detail.

Figure 21:
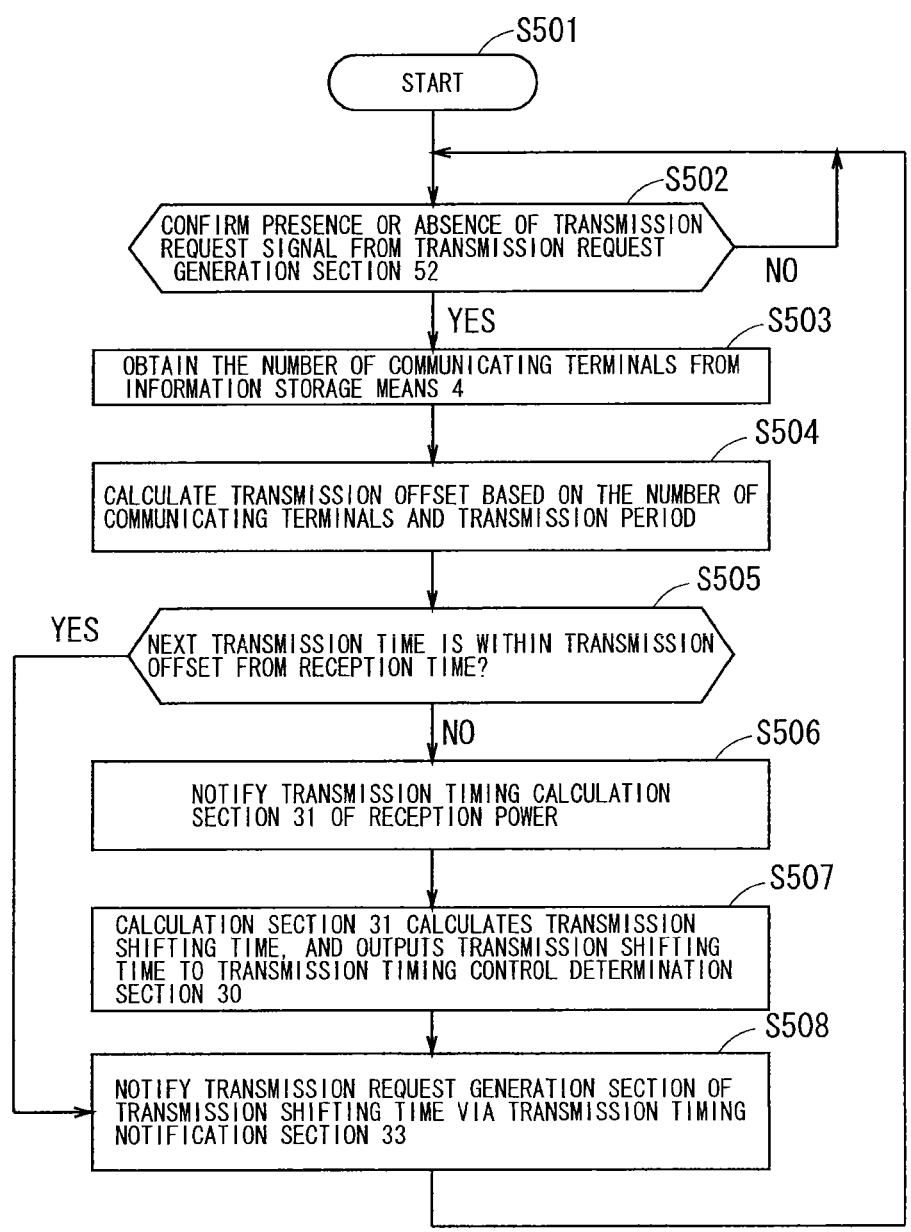
[FIG. 21] A flowchart showing an operation of a transmission timing control in transmission timing control means of the communication control apparatus according to the embodiment 3.

FIG. 21 is a flowchart showing an operation of a transmission timing control in the transmission timing control means 3C of the communication control apparatus according to the embodiment 3.

The communication control apparatus is started in step S501, and then in step S502, the transmission timing control determination section 30 of the transmission timing control means 3C confirms the presence or absence of reception, from the transmission request generation section 52, of the transmission request signal S52 for requesting a determination of whether or not to shift the transmission timing.

If no reception of the transmission request signal S52 is confirmed in step S502, the transmission timing control determination section 30 waits until reception is confirmed in step S502. If reception of the transmission request signal S52 is confirmed in step S502, then in step S503, the transmission timing control determination section 30 obtains the number of peripheral terminals that are in communication, from the terminal information accumulation section 40 of the information storage means 4.

Then, in step S504, the transmission timing control determination section 30 calculates the transmission offset time Toffset based on the number of communicating terminals n thus obtained, the reception start time t1 of the peripheral terminal that is received from the transmission request generation section 52, the next transmission request occurrence time t2 (scheduled transmission time), and a transmission period Tinterval.

Here, the transmission offset time is calculated in accordance with the following expression (9).

[Math. 9]

$$Toffset = Tinterval/n \qquad (9)$$

The transmission timing control determination section 30 determines whether or not the next transmission request occurrence time t2 is within the offset time Toffset from the reception start time t1 (S505).

In a case of "(t2−t1)≤Toffset" in step S505 (YES), then in step S506, the transmission timing control determination section 30 notifies the transmission timing calculation section 31 of the reception power PrB, and requests calculation of the transmission shifting time.

Then, in step S507, the transmission timing calculation section 31 calculates the transmission shifting time Tshift based on the reception power PrB, and outputs it to the transmission timing control determination section 30.

Here, the transmission shifting time Tshift is calculated in accordance with the expression (10), to be the value obtained by multiplying the offset time Toffset by a random integer value α (hereinafter, shift parameter) that is calculated based on the reception power. In the expression (10), a random time Trand is further added.

[Math. 10]

$$Tshift = Toffset \times \alpha + Trand \qquad (10)$$

FIG. 22 is an explanatory diagram showing, in the form of a table, the relationship between the reception power and the shift parameter. As shown in FIG. 22, the shift parameter α is set depending on the reception power.

Then, in step S508, the transmission timing control determination section 30 notifies, via the transmission timing notification section 33, the transmission request generation section 52 of the transmission shifting time Tshift as the transmission timing notifying information D33. At this time, the transmission shifting time Tshift is included in the transmission timing notifying information D33. Then, the transmission timing control process is completed, and the process returns to step S502.

On the other hand, in a case of "(t2−t1)>Toffset" in step S505, it is determined that the transmission timing is not to be shifted, and the transmission shifting time is set to be "0". Then, the process immediately moves to step S508.

The processes in step S502 to step S508 are repeatedly performed each time the transmission timing control determine request (output of the transmission request signal S52) is confirmed.

In step S504, the transmission offset time Toffset is calculated based on the transmission period and the number of communicating terminals. However, this is not limitative, and it may be also acceptable to calculate the transmission offset time Toffset by using the communication band utilization rate, the number of times information is received within a certain time period, the past reception history, and the like. Moreover, the value calculated by the expression (9) may be processed and used as the transmission offset time Toffset.

In step S507, the transmission shifting time Tshift is calculated based on the transmission offset time Toffset and the shift parameter α. However, this is not limitative. The communication band utilization rate, or the like, may be used to calculate the transmission shifting time Tshift. Alternatively, the transmission shifting time Tshift may be set so as to obtain a timing at which the communication band is idle based on the past reception history, or the transmission shifting time Tshift may be set in accordance with the positional relationship with the peripheral terminal. Furthermore, the transmission shifting time is obtained by applying the random time, and this may be calculated based on a random back-off control, or may be calculated by using the past reception history or the like.

In step S507, the shift parameter α is calculated based on the reception power, but the shift parameter α may be set based on the communication band utilization rate, the number of receptions within a certain time period, and the positional relationship with the peripheral terminal. As the random time Trand, the back-off time may be used or alternatively the maximum value of the back-off time may be used.

Figure 23:
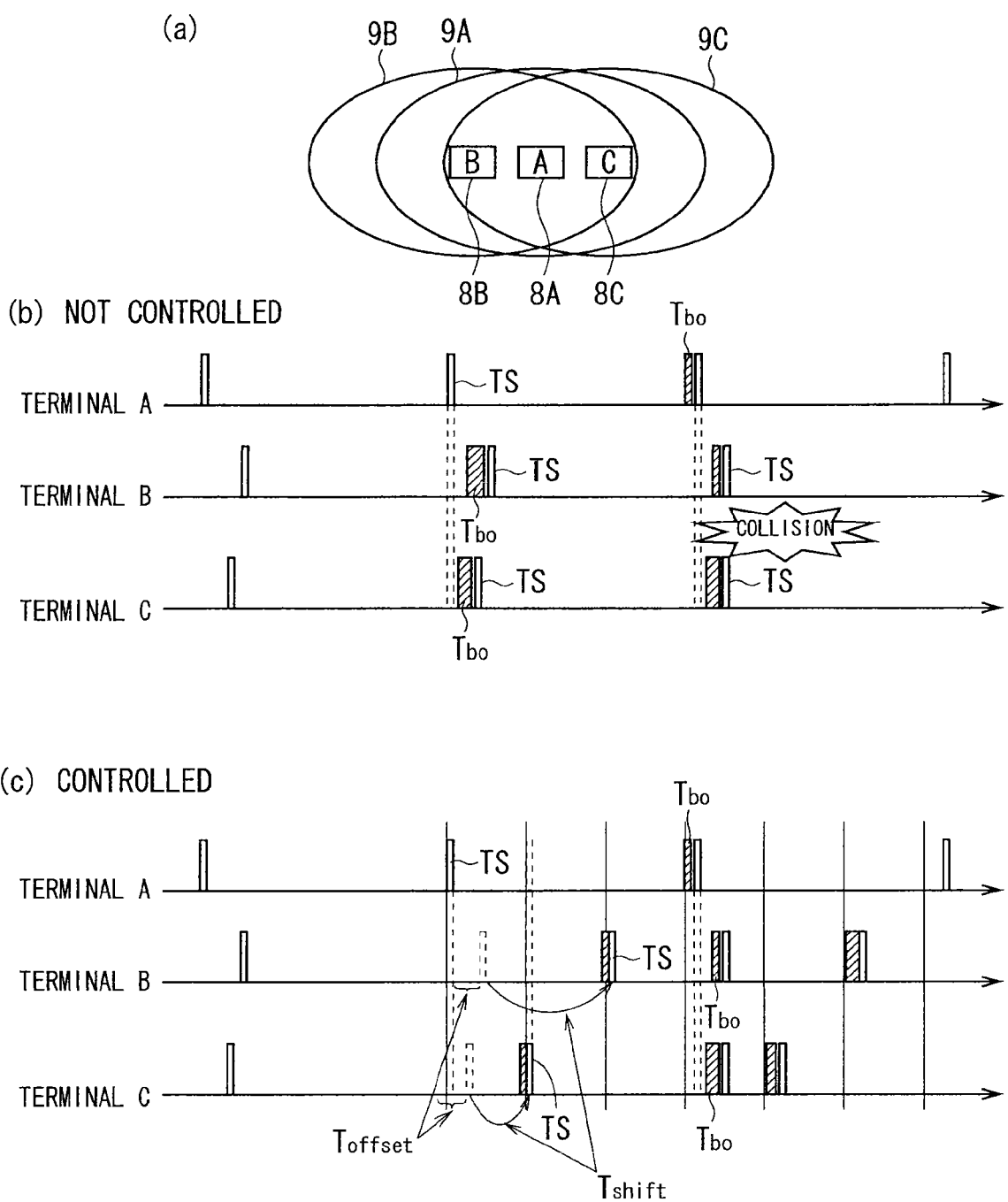
[FIG. 23] An explanatory diagram schematically showing a specific example of the transmission timing control according to the embodiment 3.

Effects of this embodiment will be described with reference to FIGS. 23 to 25. FIGS. 23 to 25 are explanatory diagrams schematically showing a specific example of a situation where terminals A, B, and C are in communication while performing the transmission timing control.

FIG. 23 shows a case where the terminals A, B, and C can mutually communicate. More specifically, as shown in part (a) of FIG. 23, terminals 8A, 8B, and 8C are located in a range where a communication range 9A of the terminal 8A, a communication range 9B of the terminal 8B, and a communication range 9C of the terminal 8C overlap one another.

FIGS. 24 and 25 show a case where the terminal B and the terminal C cannot detect a mutual communication state. More specifically, as shown in part (a) of FIG. 24 and part (a) of FIG. 25, the terminal 8B and the terminal 8C are not located within a range where the communication range 9B and the communication range 9C overlap each other.

FIG. 25 shows a situation where the terminal B is in communication with four terminals and the terminal C is in communication with three terminals. More specifically, as shown in part (a) of FIG. 25, the terminals 8A, and 8D to 8F are located in the communication range 9B, and the terminals 8A, 8G, and 8H are located in the communication range 9C.

As shown in part (b) of FIG. 23, in a case where the transmission timing control means 3C does not perform the transmission timing control, there is a possibility of collision of transmission signals TS and TS between different terminals, depending on the back-off time period Tbo. On the other hand, as shown in part (c) of FIG. 23, in a case where the transmission timing control is performed, the transmission shifting time Tshift for changing the transmission timing is appropriately set, to thereby reduce the probability that the terminals 8A to 8C will transmit the transmission signals TS at the same timing. This can reduce the possibility of collision of the transmission signals TS and TS.

As shown in part (b) of FIG. 24, in a case where transmission timings that are set in two terminals (the terminal 8B and the terminal 8C) having a hidden-terminal relationship with each other are close to each other, the possibility of collision remains. Therefore, by using the random time Trand, the transmission shifting time Tshift is set to be different values between the terminals 8B and 8C, and then the timing is changed. Thereby, increase of the possibility of collision can be prevented.

As shown in part (b) of FIG. 25, in a case where the magnitude of the transmission offset time Toffset is different between terminals, a time difference occurs in the transmission shifting time Tshift, too. As a result, the transmission timings for transmitting the transmission signal TS that are set in the respective terminals are hardly close to each other. Thus, the possibility of collision can be reduced irrespective of the random time Trand.

As described above, the communication control apparatus 102 according to this embodiment determines to shift the transmission timing, when information is received from the peripheral terminal. This enables the transmission to be performed at a timing having a low possibility of packet collision. Therefore, the reliability of communication can be improved, independently of the function of the CSMA/CA scheme.

In the communication control apparatus 102 according to this embodiment, the number of communicating terminals that is the number of peripheral terminals with which the own terminal is currently communicating, and the transmission period for transmitting the transmission data in the own terminal, are used as conditions for shifting the transmission timing. Accordingly, even in a case where the probability that packet collision will occur is relatively high, the transmission timing is shifted. Thus, even if there is a terminal that cannot be found by carrier sensing, occurrence of packet collision can be reduced.

In the communication control apparatus 102 according to this embodiment, the transmission offset that is calculated based on the number of communicating terminals and the transmission period is used for the selection of a time width at which the transmission timing is shifted. Accordingly, transmissions of the terminals can be uniformly distributed in the transmission period. Thus, occurrence of packet collision can be reduced, and delay of transmission can be reduced.

In the communication control apparatus 102 according to this embodiment, the next transmission request timing (timing for outputting the transmission request signal S52) is set at a position corresponding to an integral multiple of the transmission offset. This can efficiently distribute the transmission periods. Moreover, the transmission offset is set in accordance with the positional relationship with the peripheral terminal, and thereby the transmission timing can be set such that it is unlikely that packet collision with a hidden terminal will occur.

In the communication control apparatus 102 according to this embodiment, the shifting time by which the transmission timing is to be shifted is calculated in accordance with the reception power, or calculated based on the positional relationship with the peripheral terminal. This enables the transmission timing to be set closer with respect to the terminal located closer and to be set farther with respect to the terminal located farther. As a result, packet collision with a terminal that is likely to be a hidden terminal can be reduced, and thus the communication quality can be improved.

<Embodiment 4>

An embodiment 4 according to the present invention will be described with reference to FIGS. 26 and 27. In this embodiment 4, a description will be given on the assumption that a communication control apparatus is mainly included in a terminal that is mounted in a vehicle.

Figure 26:
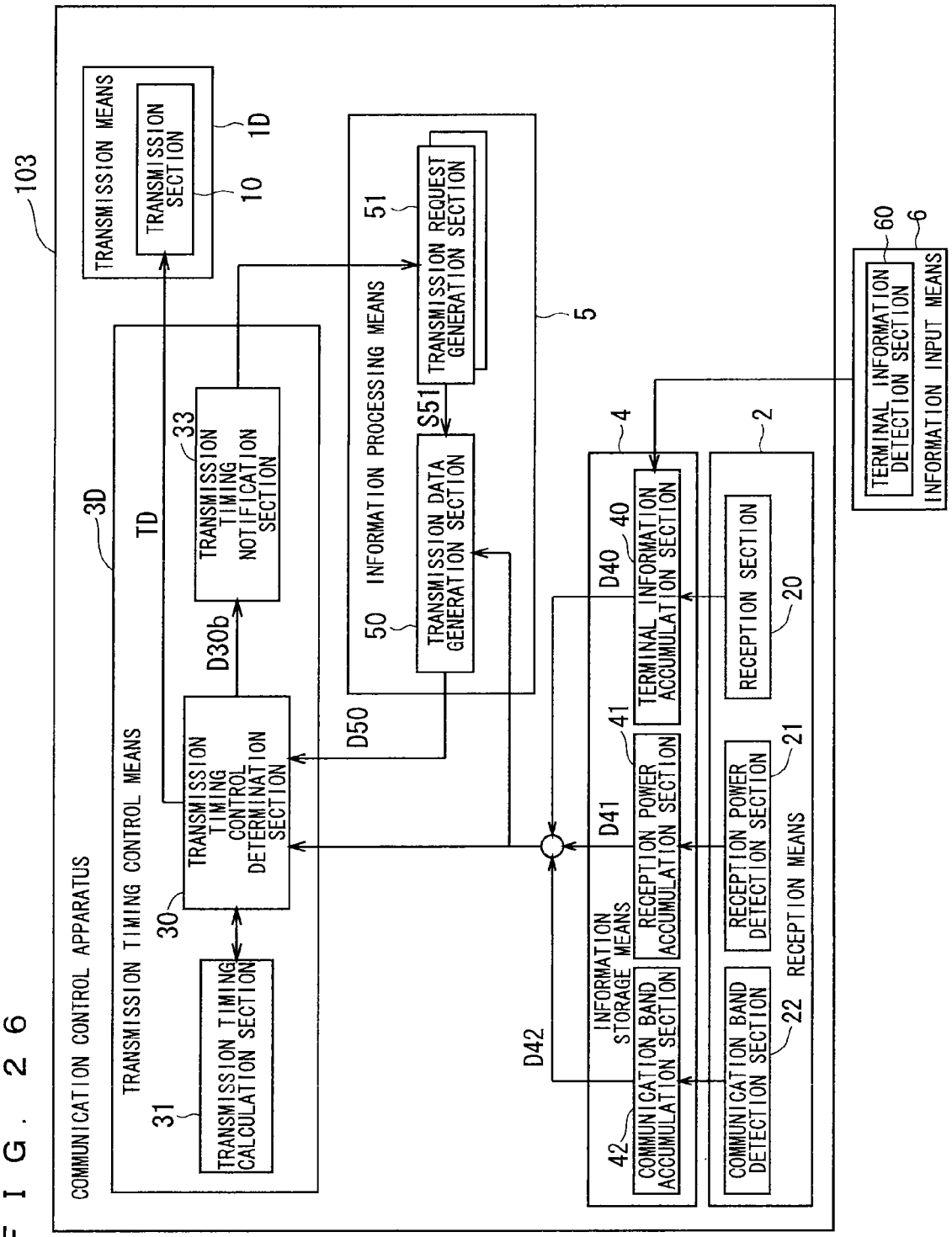
[FIG. 26] A block diagram showing a detailed configuration of a communication control apparatus according to an embodiment 4 of the present invention.

FIG. 26 is a block diagram showing a detailed configuration of a communication control apparatus 103 according to the embodiment 4 of the present invention. The same part as that of the embodiments 1 to 3 is denoted by the same reference numeral, and a detailed description thereof is omitted as appropriate.

The communication control apparatus 103 of the embodiment 4, similarly to the embodiment 1 shown in FIG. 2, includes transmission means 1D (corresponding to the transmission means 1A), the reception means 2, transmission timing control means 3D (corresponding to the transmission timing control means 3), the information storage means 4, the information processing means 5, and the information input means 6.

Accordingly, in the communication control apparatus 103 of the embodiment 4, transmission means 1D does not include the back-off calculation section 11 unlike the transmission means 1 shown in FIG. 2, which is a point different from the embodiment 1. Moreover, unlike the embodiment 1, the transmission timing control means 3D does not include the transmission timing calculation section 31.

Since the transmission means 1D of the embodiment 4 does not include the back-off calculation section 11, the calculation of the back-off time is performed by the transmission section 10, and the back-off operation is performed in accordance with the standard CSMA/CA scheme.

In the embodiment 4, the transmission timing control determination section 30 of the transmission timing control means 3D receives the transmission terminal information D50 from the transmission data generation section 50, and then obtains the last peripheral terminal reception time from the reception power information D41 of the reception power accumulation section 41, and then determines whether or not a time difference between the, which is a time when the terminal information D50 has been transmitted, and the last peripheral terminal reception time is within the maximum value of the back-off time.

If the time difference is within the maximum value of the back-off time, the transmission timing control determination section 30 outputs, to the transmission timing notification section 33, the back-off parameter information D30b indicating the maximum value or the minimum value of the back-off time.

The transmission timing control determination section 30 outputs the transmission data TD that is based on the terminal information D50 to the transmission section 10.

In the embodiment 4, when requested to shift the transmission timing by a transmission time from the transmission timing notification section 33, the transmission request generation section 52 of the information processing means 5 shifts the next transmission timing, and is ready for an output of the next transmission request signal S51.

An operation of the communication control apparatus 103 according to the embodiment 4 will be described in detail.

Figure 27:
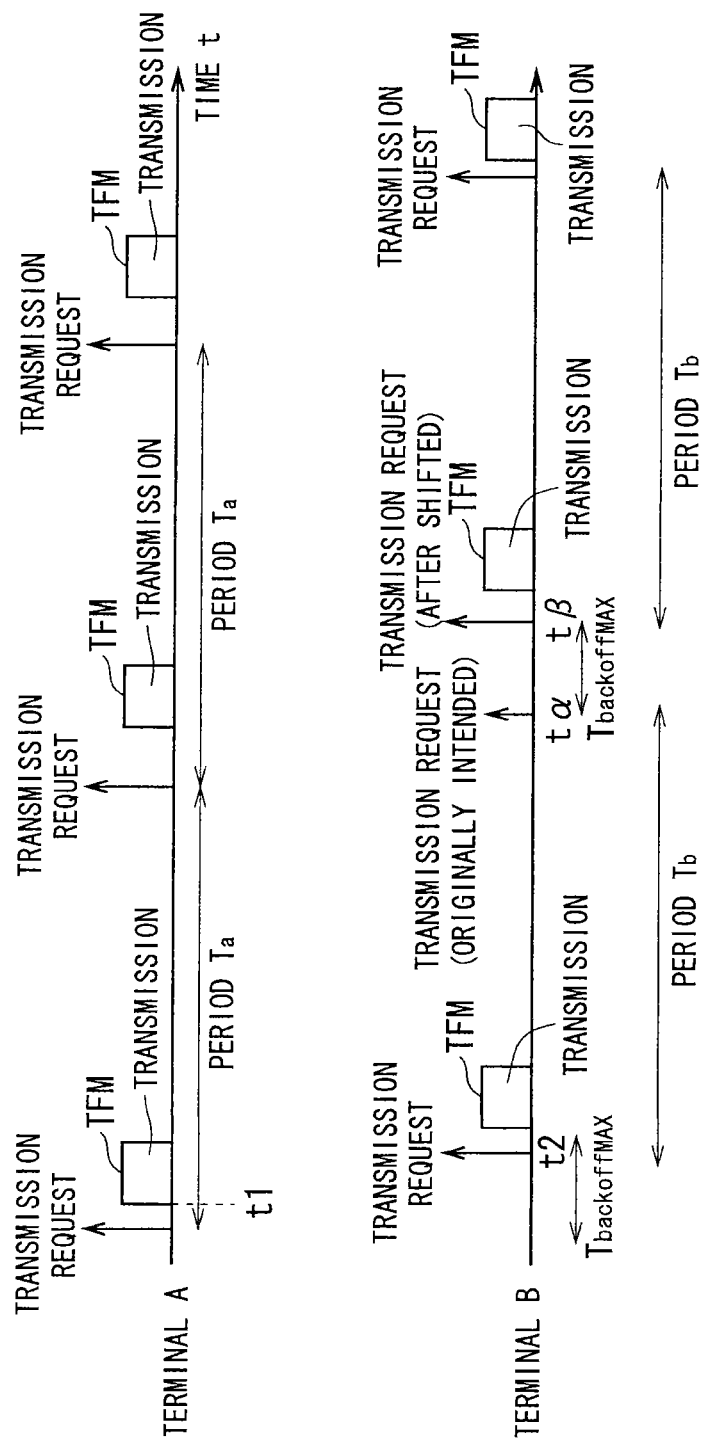
[FIG. 27] An explanatory diagram schematically showing a specific example of a transmission timing control according to the embodiment 4.

FIG. 27 is a diagram showing an operation for a transmission timing control in the transmission timing control means 3D of the communication control apparatus according to the embodiment 4. A first maximum back-off time TbackoffMAX in FIG. 27 is a time corresponding to (t2−t1) of the embodiment 1 shown in FIG. 11, and a second maximum back-off time TbackoffMAX in FIG. 27 is a time corresponding to the back-off time period Tbo2 of the embodiment 1 shown in FIG. 13. That is, FIG. 27 corresponds to a version of the embodiment 1 shown in FIG. 13 in which a time by which the transmission timing is to be shifted is the maximum back-off time TbackoffMAX instead of the back-off time period Tbo2.

The transmission timing control determination section 30 determines whether or not a time difference (t2−t1) between transmission requests in FIG. 27 is within the maximum back-off time TbackoffMAX. In FIG. 27, t1 represents a time when the terminal A starts to transmit the transmission frame TFM, and t2 represents a transmission request time.

The maximum back-off time TbackoffMAX can be calculated by the above-mentioned expressions (1) and (2). For example, when applying the following: CWmax=1024, the number of re-transmissions R=1, and the slot time S=9 microseconds, CW=1024 is obtained, and the maximum back-off time TbackoffMAX is calculated to be 9.216 msec.

If the time difference between the transmission requests is within the maximum back-off time TbackoffMAX, the transmission timing notification section 33 notifies the transmission request generation section 52 of a signal indicating the maximum back-off time TbackoffMAX, to shift the next transmission timing into tβ that is obtained by shifting an originally scheduled transmission request time to by the maximum back-off time TbackoffMAX.

In this embodiment, the transmission request timing is shifted. However, after elapse of a certain time period, such a control may be possible that the time is shifted forward by the maximum back-off time TbackoffMAX and then the original timing is recovered. A control may be also possible in which the original timing is recovered in a case where an accumulation of shifted times exceeds the transmission period. A control may be changed from the control for delaying the transmission timing into the control for advancing the transmission timing.

In an example illustrated in the embodiment 4, whether or not to shift the transmission timing is determined based on the maximum back-off time TbackoffMAX, and the transmission timing is shifted. However, the determination of the presence or absence of the transmission timing and setting the amount to be shifted may be performed based on, instead of the maximum value of the back-off time, the minimum value of the back-off time, the transmission offset calculated in the embodiment 3, or the like.

In this embodiment, the transmission timing is delayed, but the transmission timing may be advanced.

As described above, in the communication control apparatus 103 according to this embodiment, the transmission timing control determination section 30 determines whether or not to shift the transmission timing by the back-off time (for example, the maximum back-off time TbackoffMAX), in consideration of the maximum time (maximum back-off time TbackoffMAX) that is calculated in the CSMA/CA scheme. This can reduce the possibility of packet collision independently of the CSMA/CA scheme.

In the communication control apparatus 103 according to this embodiment, the control can be switched from the control for delaying the transmission timing into the control for advancing the transmission timing. Therefore, a transmission delay caused by the transmission timing control can be reduced.

<Application to Communication Control Method>

Although the communication control apparatuses 100 to 103 have been described as the embodiments 1 to 4, the present invention can be also regarded as a communication control method by replacing the operations of the means 1 to 7 with steps.

For example, assuming a control content common to the communication control apparatuses 100 to 103 of the embodiments 1 to 4, a communication control method is achieved as follows.

A communication control method executable on a predetermined terminal (own terminal) for performing wireless communication with at least one peripheral terminal other than the own terminal includes the following steps (a) to (e).

In step (a), terminal information transmitted from the at least one peripheral terminal is received as peripheral terminal information, and reception power at a time when the peripheral terminal information is received is measured, and an own terminal communication band utilization rate that is the percentage of such a time that the predetermined terminal receives the peripheral terminal information with a radio wave intensity equal to or higher than a predetermined level is measured (the process by the reception means 2).

In step (b), the peripheral terminal information, the reception power, and the own terminal communication band utilization rate obtained in the step (a) are stored as stored information (the process by the information storage means 4).

In step (c), a transmission request for requesting transmission is given by using transmission terminal information D50 (the process by the information processing means 5).

In step (d), in response to the transmission request, the stored information is referred to, and a data transmission process request is given by using the transmission data that is based on the transmission terminal information (the process by the transmission timing control means 3).

In step (e), a data transmission process for transmitting the transmission data TD to the at least one peripheral terminal is performed (the process by the transmission means 1).

In the step (d), such a control is performed that, if a time difference between a last peripheral terminal reception time that is the latest reception time of the peripheral terminal information and a transmission request time that is a time when the transmission request is given in the step (c) is less than a predetermined time, a transmission timing that is a timing for giving the data transmission process request is changed, while if the time difference is greater than the predetermined time, the transmission timing is not changed.

Therefore, whether or not to change the transmission timing is controlled independently of the carrier sensing performed for confirming whether or not at least one peripheral terminal is in communication. This exerts an effect that the possibility of collision of transmission data with the at least one peripheral terminal can be reduced.

Although the communication control apparatuses 100 to 102 have been described as the embodiments 1 to 3, the present invention can be also regarded as a communication control method by replacing the operations of the means 1 to 7 with steps.

Assuming the communication control apparatuses 100 and 101 of the embodiments 1 and 2 (a case where the congestion control means 7 is not provided), a communication control method is achieved as follows.

A communication control method executable on a predetermined terminal (own terminal) for performing wireless communication with at least one peripheral terminal includes the following steps (a) to (e).

In step (a), terminal information transmitted from the at least one peripheral terminal is received as peripheral terminal information, and reception power at a time when the peripheral terminal information is received is measured, and an own terminal communication band utilization rate that is the percentage of such a time that the predetermined terminal receives the peripheral terminal information with a radio wave intensity equal to or higher than a predetermined level is measured (the process by the reception means 2).

In step (b), the peripheral terminal information, the reception power, and the own terminal communication band utilization rate obtained in the step (a) are stored as stored information (the process by the information storage means 4).

In step (c), a transmission request for requesting transmission is given by using transmission terminal information D50 (the process by the information processing means 5).

In step (d), in response to the transmission request, the stored information is referred to, a data transmission process request is given by using the transmission data that is based on the transmission terminal information (the process by the transmission timing control means 3).

In step (e), a data transmission process for transmitting the transmission data TD to the at least one peripheral terminal is performed (the process by the transmission means 1, 1B).

In the step (e), in response to the data transmission process request given in the step (d), the data transmission process is performed after elapse of at least a back-off time. The back-off time is determined based on at least one back-off parameter BP. The step (d) includes a step of variably setting the at least one back-off parameter BP.

In this communication control method, in the step (d), the at least one back-off parameter BP is variably set.

Accordingly, the back-off time can be controlled independently of the carrier sensing performed for confirming whether or not the at least one peripheral terminal is in communication. This exerts an effect that the possibility of collision of transmission data with the at least one peripheral terminal can be reduced.

Assuming the communication control apparatuses 101 and 102 of the embodiments 2 and 3, a communication control method is achieved as follows.

A communication control method executable on a predetermined terminal for performing wireless communication with at least one peripheral terminal includes the following steps (a) to (f).

In step (a), terminal information transmitted from the at least one peripheral terminal is received as peripheral terminal information, and reception power at a time when the peripheral terminal information is received is measured, and an own terminal communication band utilization rate that is the percentage of such a time that the predetermined terminal receives the peripheral terminal information with a radio wave intensity equal to or higher than a predetermined level is measured (the process by the reception means 2). The peripheral terminal information includes a communication band utilization rate of the peripheral terminal that is a transmission source.

In step (b), the peripheral terminal information, the reception power, and the own terminal communication band utilization rate obtained in the step (a) are stored as stored information (the process by the information storage means 4).

In step (c), transmission terminal information D50 is outputted, and a transmission request for requesting transmission is given by using the transmission terminal information (the process performed by the information processing means 5C).

In step (d), in response to the transmission request, the stored information is referred to, a data transmission process request is given by using the transmission data that is based on the transmission terminal information (the process by the transmission timing control means 3C).

In step (e), transmission power at a time of a data transmission process in the next step (f), a transmission period, and the number of consecutive transmissions that is the number of times the transmission data is consecutively transmitted, are set (the process performed by the congestion control means 7).

In step (f), a data transmission process for transmitting the transmission data TD to the at least one peripheral terminal is performed (the process by the transmission means 1C). The step (f) is performed in accordance with the transmission power, the transmission period, and the number of consecutive transmissions set in the step (e).

In the step (e), the transmission power, the transmission period, and the number of consecutive transmissions are set based on the own terminal communication band utilization rate and a peripheral terminal communication band utilization rate obtained from the peripheral terminal information, which is a communication band utilization rate in the at least one peripheral terminal.

In the communication control method, in the step (e), the transmission power, the transmission period, and the number of consecutive transmissions are set based on the peripheral terminal communication band utilization rate. Therefore, even in a case where the number of the at least one peripheral terminals increases, communication congestion can be avoided. This exerts an effect that collision of the transmission data can be avoided without reducing the effect of the transmission timing control.

While the invention has been described in detail, the foregoing description is in all aspects illustrative and not restrictive. It is therefore understood that numerous modifications and variations can be devised without departing from the scope of the invention.

The invention claimed is:

1. A communication control apparatus mounted in a predetermined terminal for performing wireless communication with at least one peripheral terminal other than said predetermined terminal, said communication control apparatus comprising:
   reception means for receiving, as peripheral terminal information, terminal information transmitted from said at least one peripheral terminal, measuring reception power at a time when said peripheral terminal information is received, and measuring an own terminal communication band utilization rate that is the percentage of such a time that said predetermined terminal receives said peripheral terminal information with a radio wave intensity equal to or higher than a predetermined level;
   information storage means for storing, as stored information, said peripheral terminal information, said reception power, and said own terminal communication band utilization rate obtained from said reception means;
   information processing means for outputting transmission terminal information and sending a transmission request to transmission timing control means based on said transmission terminal information;
   the transmission timing control means for, in response to said transmission request, referring to said stored information and giving a data transmission process request by using transmission data that is based on said transmission terminal information; and
   transmission means for performing a data transmission process for transmitting said transmission data to said at least one peripheral terminal,
   wherein
   in a case where a time difference between a last peripheral terminal reception time that is the latest reception time of said peripheral terminal information and a transmission request time that is a time when said information processing means has sent said transmission request is less than a predetermined time, said transmission timing control means changes a transmission timing that is a timing when said transmission means is to perform said data transmission process, and in a case where said time difference is greater than said predetermined time, said transmission timing control means does not change said transmission timing.

2. The communication control apparatus according to claim 1, wherein
   said predetermined time includes a predetermined offset time,
   said transmission timing control means calculates said predetermined offset time based on said own terminal communication band utilization rate that is measured by said reception means.

3. The communication control apparatus according to claim 1, wherein
   in response to said data transmission process request given from said transmission timing control means, said transmission means performs transmission after elapse of at least a back-off time, said back-off time being determined based on at least one back-off parameter,
   said transmission timing control means changes said transmission timing by variably controlling at least one of said back-off parameters.

4. The communication control apparatus according to claim 2, wherein
   said peripheral terminal information includes a peripheral terminal communication band utilization rate of the peripheral terminal that is a transmission source,
   said transmission timing control means calculates said predetermined offset time based on a maximum value of said communication band utilization rate.

5. The communication control apparatus according to claim 3, wherein
   said transmission timing control means changes a content of said at least one back-off parameter based on said reception power in receiving said peripheral terminal information that is received at said last peripheral terminal reception time.

6. The communication control apparatus according to claim 1, wherein
   said transmission timing control means calculates said predetermined time based on the number of communicating terminals that is the number of peripheral terminals with which said predetermined terminal is currently communicating, and a transmission period for transmitting said transmission data in said predetermined terminal.

7. The communication control apparatus according to claim 1, wherein
   when changing said transmission timing, said transmission timing control means repeats a control for delaying the transmission timing and then switches to a control for advancing the transmission timing.

8. The communication control apparatus according to claim 1, wherein
   in response to said data transmission process request given from said transmission timing control means, said transmission means performs transmission after elapse of at least a back-off time,
   said transmission timing control means makes a control for changing said transmission timing by said back-off time.

9. A communication control method executable on a predetermined terminal for wireless communication with at least one peripheral terminal other than said predetermined terminal, said method comprising the steps of:
   (a) receiving, as peripheral terminal information, terminal information transmitted from said at least one peripheral terminal, measuring reception power at a time when said peripheral terminal information is received, and measuring an own terminal communication band utilization rate that is the percentage of such a time that said predetermined terminal receives said peripheral terminal information with a radio wave intensity equal to or higher than a predetermined level;
   (b) storing, as stored information, said peripheral terminal information, said reception power, and said own terminal communication band utilization rate obtained in said step (a);
   (c) sending a transmission request to the transmission timing control means based on transmission terminal information;
   (d) in response to said transmission request, referring to said stored information and giving a data transmission process request by using transmission data that is based on said transmission terminal information; and
   (e) performing a data transmission process for transmitting said transmission data to said at least one peripheral terminal, wherein
   in said step (d), in a case where a time difference between a last peripheral terminal reception time that is the latest reception time of said peripheral terminal information and a transmission request time that is a time when said transmission request has been sent in said step (c) is less than a predetermined time, a transmission timing that is a timing when said data transmission process request is to be given is changed, and in a case where said time difference is greater than said predetermined time, said transmission timing is not changed.

* * * * *